US012651745B2

(12) United States Patent
Groombridge et al.

(10) Patent No.: US 12,651,745 B2
(45) Date of Patent: Jun. 9, 2026

(54) LI/Na-ION BATTERY ANODE MATERIALS

(71) Applicant: Echion Technologies Limited, Cambridge (GB)

(72) Inventors: Alexander S. Groombridge, Cambridge (GB); Jean De La Verpilliere, Cambridge (GB); Sumithra Santhanam, Cambridge (GB); Wanwei Zhang, Cambridge (GB); Maurits E. Houck, Cambridge (GB)

(73) Assignee: Echion Technologies Limited, Cambridge (GB)

( * ) Notice: Subject to any disclaimer, the term of this patent is extended or adjusted under 35 U.S.C. 154(b) by 841 days.

(21) Appl. No.: 17/769,716

(22) PCT Filed: Oct. 8, 2020

(86) PCT No.: PCT/GB2020/052486
§ 371 (c)(1),
(2) Date: Apr. 15, 2022

(87) PCT Pub. No.: WO2021/074593
PCT Pub. Date: Apr. 22, 2021

(65) Prior Publication Data
US 2022/0384797 A1 Dec. 1, 2022

(30) Foreign Application Priority Data

Oct. 18, 2019 (GB) ...................................... 1915151
Feb. 21, 2020 (GB) ...................................... 2002487
(Continued)

(51) Int. Cl.
$H01M\ 4/485$ (2010.01)
$C01G\ 33/00$ (2006.01)
(Continued)

(52) U.S. Cl.
CPC ............ *H01M 4/485* (2013.01); *C01G 33/00* (2013.01); *C01G 33/006* (2013.01); *C01G 37/00* (2013.01);
(Continued)

(58) Field of Classification Search
None
See application file for complete search history.

(56) References Cited

U.S. PATENT DOCUMENTS 4,542,083 A 9/1985 Cava et al.
6,124,057 A 9/2000 Ito et al.
(Continued)

FOREIGN PATENT DOCUMENTS

CN 102326282 A 1/2012
CN 106299329 A 1/2017
(Continued)

OTHER PUBLICATIONS

Wang et al, Enhanced Electrochemical Properties of Li3VO4 with Controlled Oxygen Vacancies as Li-Ion Battery Anode, Conducting materials, pp. 5368-5374, Mar. 27, 2017 (Year: 2017).*
(Continued)

*Primary Examiner* — Mary Grace Harris
(74) *Attorney, Agent, or Firm* — Wolf, Greenfield & Sacks, P.C.

(57) ABSTRACT

The invention relates to active electrode materials and to methods for the manufacture of active electrode materials. Such materials are of interest as active electrode materials in lithium-ion or sodium-ion batteries. The invention provides an active electrode material expressed by the general formula $[M][Nb]_y[O]_z$; wherein the active electrode material is oxygen deficient; wherein M consists of one of Mg, Cr, W,
(Continued)

Mo, Cu, Ga, Ge, Ca, K, Ni, Co, Al, Sn, Mn, Ce, Sb, Y, La, Hf, Ta, Zn, In, or Cd; y satisfies $0.5 \leq y \leq 49$; and z satisfies $4 \leq z \leq 124$.

24 Claims, 16 Drawing Sheets

(30)     Foreign Application Priority Data

| | | | |
|---|---|---|---|
| Jun. 3, 2020 | (GB) | ..................................... | 2008352 |
| Jul. 28, 2020 | (GB) | ..................................... | 2011681 |
| Aug. 28, 2020 | (GB) | ..................................... | 2013576 |

(51) Int. Cl.

| | |
|---|---|
| *C01G 37/00* | (2006.01) |
| *C01G 39/00* | (2006.01) |
| *C01G 41/00* | (2006.01) |
| *C01G 45/00* | (2006.01) |
| *C01G 49/00* | (2006.01) |
| *H01M 4/04* | (2006.01) |
| *H01M 4/131* | (2010.01) |
| *H01M 4/1391* | (2010.01) |
| *H01M 4/36* | (2006.01) |
| *H01M 4/62* | (2006.01) |
| *H01M 10/0525* | (2010.01) |
| *H01M 10/054* | (2010.01) |
| *H01M 10/44* | (2006.01) |
| *H01M 4/02* | (2006.01) |

(52) U.S. Cl.

CPC ............. *C01G 39/00* (2013.01); *C01G 41/00* (2013.01); *C01G 41/006* (2013.01); *C01G 45/00* (2013.01); *C01G 49/0018* (2013.01); *C01G 49/0045* (2013.01); *H01M 4/0459* (2013.01); *H01M 4/0471* (2013.01); *H01M 4/131* (2013.01); *H01M 4/1391* (2013.01); *H01M 4/366* (2013.01); *H01M 4/625* (2013.01); *H01M 10/0525* (2013.01); *H01M 10/054* (2013.01); *H01M 10/44* (2013.01); *C01P 2002/72* (2013.01); *C01P 2002/82* (2013.01); *C01P 2002/88* (2013.01); *C01P 2004/51* (2013.01); *C01P 2004/61* (2013.01); *C01P 2004/62* (2013.01); *C01P 2004/64* (2013.01); *C01P 2004/84* (2013.01); *C01P 2006/10* (2013.01); *C01P 2006/12* (2013.01); *C01P 2006/40* (2013.01); *H01M 2004/021* (2013.01); *H01M 2004/027* (2013.01); *Y02E 60/10* (2013.01)

(56)     References Cited

U.S. PATENT DOCUMENTS

| | | | |
|---|---|---|---|
| 6,391,496 B1 | 5/2002 | Nakajima et al. | |
| 8,647,773 B2 | 2/2014 | Goodenough et al. | |
| 9,515,319 B2 | 12/2016 | Harada et al. | |
| 9,698,417 B2 | 7/2017 | Buannic et al. | |
| 9,806,339 B2 | 10/2017 | Nakahara et al. | |
| 10,263,243 B2 | 4/2019 | Inoue et al. | |
| 10,749,169 B2 | 8/2020 | Harada et al. | |
| 11,721,806 B2 | 8/2023 | Groombridge et al. | |
| 11,799,077 B2 | 10/2023 | Groombridge et al. | |
| 11,973,220 B2 | 4/2024 | Groombridge et al. | |
| 12,027,699 B2 | 7/2024 | Groombridge et al. | |
| 12,381,210 B2 | 8/2025 | Groombridge et al. | |
| 2006/0166098 A1* | 7/2006 | Tabuchi | H01M 4/364 |
| | | | 429/232 |
| 2007/0048611 A1* | 3/2007 | Yamamoto | H01M 4/38 |
| | | | 429/231.1 |

| | | | |
|---|---|---|---|
| 2011/0206991 A1 | 8/2011 | Nakahara et al. | |
| 2012/0052401 A1 | 3/2012 | Goodenough et al. | |
| 2014/0044997 A1 | 2/2014 | Inagaki et al. | |
| 2015/0010820 A1 | 1/2015 | Takami et al. | |
| 2015/0086872 A1 | 3/2015 | Ise et al. | |
| 2015/0270543 A1 | 9/2015 | Harada et al. | |
| 2016/0036040 A1* | 2/2016 | Takami | H01M 4/662 |
| | | | 429/231.1 |
| 2016/0087275 A1 | 3/2016 | Zhang et al. | |
| 2016/0268602 A1 | 9/2016 | Inagaki et al. | |
| 2016/0276650 A1 | 9/2016 | Hoshina et al. | |
| 2016/0276662 A1 | 9/2016 | Ise et al. | |
| 2017/0040643 A1 | 2/2017 | Dolle et al. | |
| 2017/0077509 A1 | 3/2017 | Ise et al. | |
| 2018/0083283 A1 | 3/2018 | Yamashita et al. | |
| 2018/0219221 A1 | 8/2018 | Yamauchi | |
| 2018/0277835 A1 | 9/2018 | Ise et al. | |
| 2018/0277907 A1 | 9/2018 | Iwasaki et al. | |
| 2019/0044179 A1 | 2/2019 | Sugimori et al. | |
| 2019/0088941 A1 | 3/2019 | Harada et al. | |
| 2019/0252131 A1 | 8/2019 | Zhamu et al. | |
| 2019/0280291 A1 | 9/2019 | Pan et al. | |
| 2019/0288283 A1 | 9/2019 | Harada et al. | |
| 2020/0013618 A1 | 1/2020 | Weng et al. | |
| 2020/0048107 A1 | 2/2020 | Shigesato et al. | |
| 2020/0091502 A1 | 3/2020 | Harada et al. | |
| 2020/0091513 A1 | 3/2020 | Harada et al. | |
| 2020/0112018 A1* | 4/2020 | Zhang | H01M 10/0565 |
| 2020/0136148 A1 | 4/2020 | Ma et al. | |
| 2020/0140339 A1 | 5/2020 | Ko et al. | |
| 2020/0152963 A1 | 5/2020 | Zhang et al. | |
| 2020/0176756 A1 | 6/2020 | Fukushima et al. | |
| 2020/0235384 A1 | 7/2020 | Yoshioka et al. | |
| 2020/0295363 A1* | 9/2020 | Sasakawa | H01M 4/525 |
| 2022/0380226 A1 | 12/2022 | Groombridge et al. | |
| 2022/0384798 A1 | 12/2022 | Groombridge et al. | |
| 2023/0071080 A1 | 3/2023 | Shivareddy et al. | |
| 2023/0178719 A1 | 6/2023 | Groombridge et al. | |
| 2023/0197942 A1 | 6/2023 | Groombridge et al. | |
| 2023/0231123 A1 | 7/2023 | Groombridge et al. | |
| 2023/0361288 A1 | 11/2023 | Groombridge et al. | |
| 2023/0378449 A1 | 11/2023 | Groombridge et al. | |
| 2023/0411613 A1 | 12/2023 | Groombridge et al. | |
| 2024/0030424 A1 | 1/2024 | Groombridge et al. | |
| 2025/0033991 A1 | 1/2025 | Groombridge et al. | |

FOREIGN PATENT DOCUMENTS

| | | | | |
|---|---|---|---|---|
| CN | 106532109 A | 3/2017 | | |
| CN | 107742716 A | 2/2018 | | |
| CN | 108807963 A | 11/2018 | | |
| CN | 109167049 A | 1/2019 | | |
| CN | 109244443 A | 1/2019 | | |
| CN | 109360978 A | 2/2019 | | |
| CN | 109904441 A | 6/2019 | | |
| CN | 109928750 A | 6/2019 | | |
| CN | 110137481 A | 8/2019 | | |
| CN | 110137493 A | * | 8/2019 | ............. B82Y 30/00 |
| CN | 110304658 A | 10/2019 | | |
| CN | 107742716 B | 4/2020 | | |
| DE | 69707637 T2 | 8/2002 | | |
| EP | 0 853 347 A1 | 7/1998 | | |
| EP | 2 361 888 A2 | 8/2011 | | |
| EP | 2 503 625 A3 | 7/2015 | | |
| EP | 2 975 679 A1 | 1/2016 | | |
| EP | 2 980 891 A1 | 2/2016 | | |
| EP | 3 070 767 A1 | 6/2016 | | |
| EP | 3 121 878 A1 | 1/2017 | | |
| EP | 3 220 454 B1 | 9/2019 | | |
| EP | 3 539 927 A1 | 9/2019 | | |
| EP | 4 230 586 A1 | 8/2023 | | |
| GB | 2588254 A | 4/2021 | | |
| GB | 2588264 A | 4/2021 | | |
| GB | 2595745 A | 12/2021 | | |
| GB | 2598432 A | 3/2022 | | |
| GB | 2598438 A | 3/2022 | | |
| JP | H09-253495 A | 9/1997 | | |
| JP | H10-233208 A | 9/1998 | | |
| JP | H10-255796 A | 9/1998 | | |

(56)　　　　　References Cited

FOREIGN PATENT DOCUMENTS

| | | |
|---|---|---|
| JP | 3390327 B2 | 3/2003 |
| JP | 3426901 B2 | 7/2003 |
| JP | 5694411 B2 | 4/2015 |
| JP | 2015-179634 A | 10/2015 |
| JP | 2016-054051 A | 4/2016 |
| JP | 2017-084675 A | 5/2017 |
| JP | 6200533 B2 | 9/2017 |
| KR | 20150131800 A | 11/2015 |
| WO | WO 2015/045254 A1 | 4/2015 |
| WO | WO 2015/138019 A1 | 9/2015 |
| WO | WO 2019/126690 A1 | 6/2019 |
| WO | WO 2019/188772 A1 | 10/2019 |
| WO | WO 2019/234248 A1 | 12/2019 |
| WO | WO 2019/243614 A1 | 12/2019 |
| WO | WO 2020/073915 A1 | 4/2020 |
| WO | WO 2020/098427 A1 | 5/2020 |
| WO | WO 2019/093404 A1 | 7/2020 |
| WO | WO 2021/074406 A1 | 4/2021 |
| WO | WO 2021/074592 A1 | 4/2021 |
| WO | WO 2021/074593 A1 | 4/2021 |
| WO | WO 2021/074594 A1 | 4/2021 |
| WO | WO 2021/245410 A1 | 12/2021 |

OTHER PUBLICATIONS

Machine English Translation of CN110137493A from Espacenet originally published to Chen Aug. 16, 2019 (Year: 2019).*

Heinrich, Christophe, Tetragonal tungsten bronzes Nb8-xW9+xO47-δ: optimization strategies and transport properties of a new n-type thermoelectric oxide, Jul. 3, 2015, Materials Horizon (Year: 2015).*

Shengjue Deng et al., Jiangping Tu,Oxygen vacancy modulated Ti2Nb10O29-x embedded onto porous bacterial cellulose carbon for highly efficient lithium ion storage, Jan. 16, 2019, Nano Energy, vol. 58, 2019, pp. 355-364, ISSN 2211-2855 (Year: 2019).*

Search Report under Section 17 for Application No. GB2104713.9 dated May 26, 2021.

Search Report under Section 17 for Application No. GB2105082.8 dated Jun. 1, 2021.

Examination Report under Section 18(3) for GB Application No. GB2105082.8 dated Aug. 5, 2021.

International Search Report and Written Opinion for International Application No. PCT/GB2021/051357 dated Aug. 9, 2021.

International Search Report and Written Opinion for International Application No. PCT/GB2021/051358 dated Aug. 9, 2021.

Benabbas et al., Redetermination of the structure of PNb9O25. Acta Cryst. Apr. 1991;47(4):849-50.

Glaum et al., Resource-Efficient Alkane Selective Oxidation on New Crystalline Solids: Searching for Novel Catalyst Materials. Special Issue: Innovative Technologien fur Ressourceneffizienz. Oct. 2012;84(10):1766-79.

Koçer et al., Cation Disorder and Lithium Insertion Mechanism of Wadsley-Roth Crystallographic Shear Phases from First Principles. J Am Chem Soc. Sep. 25, 2019;141(38):15121-15134. doi: 10.1021/jacs.9b06316. Epub Sep. 12, 2019.

Lou et al., Crystal Structure Modification Enhanced FeNb11O29 Anodes for Lithium-Ion Batteries. ChemElectroChem. Dec. 2017;4(12):3171-80.

Roth et al., The crystal structure of PNbO25 (P2O5.9Nb2O5). Acta Cryst. Apr. 1965;18(4):643-7.

Shannon, Revised effective ionic radii and systematic studies of interatomic distances in halides and chalcogenides. Acta Cryst. 1976;A32:751-67.

Tabero, Thermal expansion of phases formed in the system Nb2O5-MoO3. J Therm Anal Calorim. Nov. 2003;74(2):491-6.

Xu et al., Synthesis, structure, and physical properties of niobium phosphate bronze (Nb18P2.5O50). Inorg Chem. Jan. 1, 1994;33(2):267-70.

Yu et al., PNb9O25 nanofiber as a high-voltage anode material for advanced lithium ions batteries. J Materiomics. Dec. 2020;6(4):781-7. Journal Pre-proof.

U.S. Appl. No. 17/769,717, filed Apr. 15, 2022, Groombridge et al.

U.S. Appl. No. 17/769,720, filed Apr. 15, 2022, Groombridge et al.

U.S. Appl. No. 17/775,239, filed May 6, 2022, Groombridge et al.

GB2002487.3, Apr. 10, 2020, Search Report.

GB2002487.3, May 13, 2020, Further Search Report.

GB2008352.3, Jul. 9, 2020, Search Report.

GB2013576.0, Oct. 20, 2020, Search Report.

GB2104508.3, Sep. 10, 2021, Search Report.

GB2105091.9, May 27, 2021, Search Report.

PCT/GB2020/052485, Mar. 12, 2021, International Search Report.

PCT/GB2020/052486, Jan. 18, 2021, International Search Report.

PCT/GB2020/052487, Mar. 12, 2021, International Search Report.

PCT/GB2021/052228, Nov. 17, 2021, International Search Report.

Amonpattarakit et al., X-Ray Diffraction and Zn K-Edge XANES Studies of Perovskite Ferroelectric PZT-PZN Powders Derived from Zn2Nb34O87 Precursor. Ferroelectrics. Feb. 17, 2016;492:25-34.

Drozhzhin et al., Li-ion diffusion in LixNb9PO25. Electrochim Acta. Feb. 1, 2013;89:262-9.

Ji et al., Carbon-emcoating architecture boosts lithium storage of Nb2O5. Science China Materials. Dec. 24, 2020;64(5):1071-86.

Li et al., Electrochemical Lithium Intercalation in Monoclinic Nb12O29. Chem Mater. Apr. 14, 2011;23(9):2292-4.

Lou et al., Nb-Based Oxides as Anode Materials for Lithium Ion Batteries. Progress in Chemistry. Mar. 2015;27(2/3):297-309.

Lu et al., Investigation of Physical and Electrochemical Properties of β-TaxNb1-xPO5 as an Electrode Material for Lithium Batteries. Chem Mater. Apr. 15, 2016;28(9):2949-61.

Yang et al., Conductive Copper Niobate: Superior Li+-Storage Capability and Novel Li+-Transport Mechanism. Adv Energ Mater. Oct. 17, 2019;9(39):1902174.

Search Report under Section 17 for Application No. GB2002487.3 dated Apr. 10, 2020.

Further Search Report under Section 17 for Application No. GB2002487.3 dated May 13, 2020.

Search Report under Section 17 for Application No. GB2008352.3 dated Jul. 9, 2020.

Search Report under Section 17 for Application No. GB2011681.0 dated Sep. 8, 2020.

Search Report under Section 17 for Application No. GB2013576.0 dated Oct. 20, 2020.

Search Report under Section 17 for Application No. GB2104508.3 dated Sep. 10, 2021.

Search Report under Section 17 for Application No. GB2105091.9 dated May 27, 2021.

International Search Report for International Application No. PCT/GB2020/052485 dated Mar. 12, 2021.

International Search Report for International Application No. PCT/GB2020/052486 dated Jan. 18, 2021.

International Search Report for International Application No. PCT/GB2020/052487 dated Mar. 12, 2021.

International Search Report for International Application No. PCT/GB2021/052228 dated Nov. 17, 2021.

Bergner et al., VNb9O25-δ—Synthesis, electrical conducting behaviour and density functional theory (DFT) calculation. J Solid State Chem. Aug. 2009;182(8):2053-60.

Bini et al., The Doping of FeNb11O29 as a Way to Improve Its Electrochemical Performances. ChemistrySelect. May 21, 2019;4(19):5656-61.

Cava et al., Lithium Insertion in Wadsley-Roth Phases Based on Niobium Oxide. J Electrochem Soc. Jan. 1, 1983;130(12):2345-51.

Cava et al., Lithium insertion, electrical conductivity, and chemical substitution in various crystallographic shear structures. Solid State Ionics. Dec. 1983;9-10(Part 1):407-11.

Fu et al., Design, synthesis and lithium-ion storage capability of A10.5Nb24.5O62. J Mater Chem A. Aug. 13, 2019;7(34):19862-71.

Fu et al., Highly conductive CrNb11O29 nanorods for use in high-energy, safe, fast-charging and stable lithium-ion batteries. J Power Sources. Sep. 1, 2018;397:231-9.

Goodenough et al., The Li-ion rechargeable battery: a perspective. J Am Chem Soc. Jan. 30, 2013;135(4):1167-76. doi: 10.1021/ja3091438. Epub Jan. 18, 2013.

(56) References Cited

OTHER PUBLICATIONS

Griffith et al., High-Rate Intercalation without Nanostructuring in Metastable Nb2O5 Bronze Phases. J Am Chem Soc. Jul. 20, 2016;138(28):8888-99. doi: 10.1021/jacs.6b04345. Epub Jul. 10, 2016.

Griffith et al., Niobium tungsten oxides for high-rate lithium-ion energy storage. Nature. Jul. 2018;559(7715):556-563. doi: 10.1038/s41586-018-0347-0. Epub Jul. 25, 2018.

Griffith et al., Structural Stability from Crystallographic Shear in TiO2-Nb2O5 Phases: Cation Ordering and Lithiation Behavior of TiNb24O62. Inorg Chem. Mar. 20, 2017;56(7):4002-10.

Griffith et al., Titanium Niobium Oxide: From Discovery to Application in Fast-Charging Lithium-Ion Batteries. Chem Mater. Dec. 17, 2020;33(1):4-18.

Jayaprakash et al., A new class of tailor-made Fe0.92Mn0.08Si2 lithium battery anodes: Effect of composite and carbon coated Fe0.92Mn0.08Si2 anodes. Intermetallics. Mar. 2007:15(3):442-50.

Li et al., High-performance fuel electrodes based on NbTi0.5M0.5O4 (M=Ni, Cu) with reversible exsolution of the nano-catalyst for steam electrolysis. J Mater Chem A. May 2013;1(31):8984-93.

Li et al., Novel GaNb49O124 microspheres with intercalation pseudocapacitance for ultrastable lithium-ion storage. Ceramics International. Jun. 15, 2019;45(9):12211-7.

Lou et al., Exploration of Cr0.2Fe0.8Nb11O29 as an advanced anode material for lithium-ion batteries of electric vehicles. Electrochim Acta. Aug. 10, 2017;245:482-8.

Lou et al., GaNb11O29 Nanowebs as High-Performance Anode Materials for Lithium-Ion Batteries. ACS Appl Nano Mater. Dec. 21, 2017;1(1):183-90.

Lou et al., New Anode Material for Lithium-Ion Batteries: Aluminum Niobate (AlNb11O29). ACS Appl Mater Interfaces. Feb. 13, 2019;11(6):6089-6096. doi: 10.1021/acsami.8b20246. Epub Feb. 4, 2019. Supporting Information.

Montemayor et al., Lithium insertion in two tetragonal tungsten bronze type phases, M8W9O47 (M=Nb and Ta). J Mater Chem. 1998;8(12):2777-81.

Morcrette et al., In situ X-ray diffraction techniques as a powerful tool to study battery electrode materials. Electrochim Acta. Jul. 27, 2002;47(19):3137-49.

Patoux et al., A Reversible Lithium Intercalation Process in an ReO3 Type Structure PNb9 O 25. J Electrochem Soc. Feb. 19, 2002;149(4):A391-400.

Preefer et al., Multielectron Redox and Insulator-to-Metal Transition upon Lithium Insertion in the Fast-Charging, Wadsley-Roth Phase PNb9O25. Chem Mater. May 13, 2020;32(11):4553-63. Author manuscript provided. 59 pages.

Qian et al., High-Rate Long-Life Pored Nanoribbon VNb9O25 Built by Interconnected Ultrafine Nanoparticles as Anode for Lithium-Ion Batteries. ACS Appl Mater Interfaces. Sep. 13, 2017;9(36):30608-30616. doi: 10.1021/acsami.7b07460. Epub Sep. 1, 2017.

Saritha et al., Electrochemical Li insertion studies on WNb12O33—A shear ReO3 type structure. J Solid State Chem. May 2010;183(5):988-93.

Saritha, Electrochemical analysis of tungsten bronze-type phases, W9Nb8O47 and W7Nb4O31, synthesised by sol-gel method. Mater Sci Eng B. Feb. 2018;228:218-23.

Solis et al., Adjusting the conduction properties of La0.995Ca0.005NbO4—δ by doping for proton conducting fuel cells electrode operation. Solid State Ionics. May 19, 2011;190(1):38-45.

Song et al., A Mo-doped TiNb2O7 anode for lithium-ion batteries with high rate capability due to charge redistribution. Chem Commun (Camb). Jun. 18, 2015;51(48):9849-52. doi: 10.1039/c5cc02221e. Author manuscript provided. 5 pages.

Spada et al., Deepening the shear structure FeNb11O29: influence of polymorphism and doping on structural, spectroscopic and magnetic properties. Dalton Trans. Nov. 13, 2018;47(44):15816-15826. doi: 10.1039/c8dt02896f.

Stephenson, A structural investigation of some stable phases in the region Nb2O5.WO3-WO3. Acta Cryst Section B. Jan. 1, 1968;B24:637-53.

Takashima et al., Characterization of mixed titanium-niobium oxide Ti2Nb10O29 annealed in vacuum as anode material for lithium-ion battery. J Power Sources. Feb. 15, 2015;276:113-9.

Tomaszewska et al., Lithium-ion battery fast charging: A review. eTransportation. Aug. 2019;1:100011.

Wu et al., Rational synthesis of Cr0.5Nb24.5O62 microspheres as high-rate electrodes for lithium ion batteries. J Colloid Interface Sci. Mar. 7, 2020;562:511-517. doi: 10.1016/j.jcis.2019.11.085. Epub Nov. 21, 2019.

Xiao et al., The positive effect of nitridation on CrNb49O124 nanowires for high-performance lithium-ion storage. Ceramics International. Jul. 2020;46(10):15527-33.

Yan et al., Electrospun WNb12O33 nanowires: superior lithium storage capability and their working mechanism. J Mater Chem A. Apr. 10, 2017;5(19):8972-80.

Yang et al., Cr0.5Nb24.5O62 Nanowires with High Electronic Conductivity for High-Rate and Long-Life Lithium-Ion Storage. ACS Nano. Apr. 25, 2017;11(4):4217-4224. doi: 10.1021/acsnano.7b01163. Epub Apr. 3, 2017.

Yang et al., Porous ZrNb24O62 nanowires with pseudocapacitive behavior achieve high-performance lithium-ion storage. J Mater Chem A. Sep. 25, 2017;5(42):22297-304.

Yang et al., Wadsley-Roth Crystallographic Shear Structure Niobium-Based Oxides: Promising Anode Materials for High-Safety Lithium-Ion Batteries. Adv Sci (Weinh). Jun. 2021;8(12):e2004855. doi: 10.1002/advs.202004855. Epub Mar. 15, 2021.

Ye et al., Constructing Hollow Nanofibers To Boost Electrochemical Performance: Insight into Kinetics and the Li Storage Mechanism for CrNb49O124. ACS Appl Energy Mater. Mar. 12, 2019;2(4):2672-9.

Ye et al., Highly efficient lithium container based on non-Wadsley-Roth structure Nb18W16O93 nanowires for electrochemical energy storage. Electrochim Acta. Dec. 1, 2018;292:331-8. Author manuscript provided. 39 pages.

Yu et al., The journey of lithium ions in the lattice of PNb9O25. Mater Chem Front. Dec. 20, 2019;4(2):631-7.

Yuan et al., Recent Advances in Titanium Niobium Oxide Anodes for High-Power Lithium-Ion Batteries. Energy Fuels. Sep. 21, 2020;34(11):13321-34. Author manuscript provided. 50 pages.

Zhai et al., Oxygen vacancy boosted the electrochemistry performance of Ti4+ doped Nb2O5 toward lithium ion battery. Appl Surf Sci. Jan. 1, 2020;499:143905.

Zheng et al., Rational construction and decoration of Fe0.5Nb24.5O62-x@C nanowires as superior anode material for lithium storage. Chem Eng J. Mar. 15, 2020;384:123314.

Zhou et al., Facile spray drying route for the Three-Dimensional Graphene-encapsulated Fe2O3 Nanoparticles for Lithium Ion Battery Anodes. Ind Eng Chem Res. 2013;52:1197-204.

Zhu et al., An inverse opal Cu2Nb34O87 anode for high-performance Li+ storage. Chem Commun (Camb). Jul. 7, 2020;56(53):7321-7324. doi: 10.1039/d0cc02016h. Epub Jun. 1, 2020. Author manuscript provided. 5 pages.

Zhu et al., Mg2Nb34O87 Porous Microspheres for Use in High-Energy, Safe, Fast-Charging, and Stable Lithium-Ion Batteries. ACS Appl Mater Interfaces. Jul. 18, 2018;10(28):23711-23720. doi: 10.1021/acsami.8b03997. Epub Jul. 5, 2018.

Zhu et al., MoNb12O33 as a new anode material for high-capacity, safe, rapid and durable Li+ storage: structural characteristics, electrochemical properties and working mechanisms. J Mater Chem A. Mar. 2019;7(11):6522-32.

Zhu et al., Zinc niobate materials: crystal structures, energy-storage capabilities and working mechanisms. J Mater Chem A. Oct. 31, 2019;7(44):25537-47.

International Search Report and Written Opinion for International Application No. PCT/GB2022/050820 dated Jul. 4, 2022.

Griffith et al., Niobium tungsten oxides for high-rate lithium-ion energy storage. Nature. Jul. 2018;559(7715):556-563. doi: 10.1038/s41586-018-0347-0. Epub Jul. 25, 2018. Including Supplementary Information.

(56) References Cited

OTHER PUBLICATIONS

Ariyoshi et al., Synthesis and Characterization of Lithium Inserts with Polyhedral Structures. Battery Symposium Proceedings. Nov. 19, 2014;55:518.

* cited by examiner sample 20 sample 19 sample 17 sample 7 sample 6

20        30        40        50        60

2Θ [°]

sample 21 sample 11 sample 10

20        30        40        50        60        70

2Θ [°]

LI/Na-ION BATTERY ANODE MATERIALS

RELATED APPLICATIONS

This Application is a national stage filing under 35 U.S.C. § 371 of International Patent Application Serial No. PCT/GB2020/052486, filed Oct. 8, 2020, entitled "Li/Na-Ion Battery Anode Materials," which claims priority to GB application number 2013576.0, filed Aug. 28, 2020, GB application number 2011681.0, filed Jul. 28, 2020, GB application number 2008352.3, filed Jun. 3, 2020, GB application number 2002487.3, filed Feb. 21, 2020, and GB application number 1915151.3, filed Oct. 18, 2019, each of which is herein incorporated by reference in their entireties.

FIELD OF THE INVENTION

The present invention relates to electrode active materials and to methods for the manufacture of electrode active materials. Such materials are of interest for example as electrode active materials in lithium ion or sodium ion batteries.

BACKGROUND

Lithium ion (Li-ion) batteries are a commonly used type of rechargeable battery with a global market estimated at $40bn in 2018 and predicted to grow to $200bn by 2030. This large market is divided between various applications, ranging from transport and utility-scale energy storage to consumer electronics and power tools. Accordingly, rechargeable (secondary) Li-ion batteries are currently under intense research and development to improve their performance to reach industrial demands of the technology [Goodenough and Park (2013)]. In particular, Li-ion batteries are the technology of choice for electric vehicles that have multiple demands across technical performance to environmental impact, providing a viable pathway for a green automotive industry.

A typical lithium-ion battery is composed of multiple cells connected in series or in parallel. Each individual cell is usually composed of an anode (negative polarity electrode) and a cathode (positive polarity electrode), separated by a porous, electrically insulating membrane (called a separator), immersed into a liquid (called an electrolyte) enabling lithium ions transport.

In most systems, the electrodes are composed of an electrochemically active material—meaning that it is able to chemically react with lithium ions to store and release them reversibly in a controlled manner—mixed if necessary with an electrically conductive additive (such as carbon) and a polymeric binder. A slurry of these components is coated as a thin film on a current collector (typically a thin foil of copper or aluminium), thus forming the electrode upon drying.

In the known Li ion battery technology, the poor rate capability of graphite anodes upon battery charging is a serious impediment to its application in high-power electronics, automotive and industry. Among a wide range of potential alternatives proposed recently, Si, Si alloys and lithium titanate (LTO), and niobium oxide-based materials are the main contenders to replace graphite as the active material of choice for high power applications.

Battery charge rate is usually expressed as a "C-rate". 1 C charge rate means a charge current such that the battery is fully charged in 1 h, 10 C charge means that the battery is fully charged in 1/10th of an hour (6 minutes).

Batteries relying on a graphitic anode are fundamentally limited in terms of charging rate. Under nominal conditions, lithium ions are inserted into the anode active material upon charging. When charging rate increases, typical graphite voltage profiles are such that there is a high risk that overpotentials lead to the potential of the anode to become <0 V vs. Li/Li+, which leads to a phenomenon called lithium dendrite electroplating, whereby lithium ions instead deposit at the surface of the graphite electrode as lithium metal. This leads to irreversible loss of active lithium and hence rapid capacity fade of the cell. In some cases these dendritic deposits can grow to such large sizes that they pierce the battery separator and lead to a short-circuit of the cell. This can trigger a catastrophic failure of the cell leading to a fire or an explosion. Accordingly, the fastest-charging batteries having graphitic anodes are limited to charging rates of 5-7 C, but often less. Despite this, graphitic anodes accounted for >90% of the Li-ion battery market in 2018.

Si and Si alloys offer large specific capacities but suffer from poor lifetime when charged and discharged at high rates, as well as poor capacity retention when increasing rates from low rates (e.g. 0.5 C) to higher rates (e.g. 5 C). This is due to inhomogeneous lithiation of the active material particles upon charging due to limited diffusion rates of lithium ions within the particles. The core of the active material particles (typically 1-20 μm spheres) may not have time to be lithiated upon fast charge as lithium ions need to diffuse to it from the particle surface, hence poor capacity retention when increasing charge rate. Moreover, Si and Si alloys active materials physically expand up to 400% by volume upon lithiation.

Inhomogeneous particle lithiation therefore leads to internal mechanical stresses within the particles, which can lead to their break up and electrode pulverisation, hence the poor cycle life of these electrodes upon fast charging.

Lithium titanate (LTO) anodes do not suffer from dendrite electroplating at high charging rate thanks to their high potential (1.6 V vs. Li/Li+), and have excellent cycle life as they do not suffer from volume expansion upon lithiation. LTO cells are typically regarded as high safety cells for these two reasons. However LTO is a relatively poor electronic and ionic conductor, which leads to limited capacity retention at high rate, unless the material is nanosized to increase specific surface area, and carbon-coated to increase electronic conductivity. This particle-level material engineering increases material particle cost, and decreases the tapped-density of the active material LTO powders. This is significant because it leads to low density electrodes and a higher fraction of electrochemically inactive material (e.g. binder, carbon additive).

A key measure of anode performance is its volumetric capacity (mAh/cm$^3$), that is, the amount of electric charges (that is lithium ions) that can be stored per unit volume of the anode. This is an important factor to determine the overall battery energy density on a volumetric basis (Wh/L). Volumetric capacity can be approximated as the product of electrode density, active material specific capacity, and fraction of active material in the electrode. LTO anodes typically have relatively low specific capacities (c. 170 mAh/g, to be compared with c. 330 mAh/g for graphite), which, combined with their low electrode densities (typically 1.9 g/cm$^3$) and low active material fractions (<87%) discussed above, lead to very low volumetric capacities (<300 mAh/cm$^3$) and therefore low battery energy density and high $/kWh cost. As a result, LTO batteries/cells are generally limited to specific niche applications, despite their long cycle life, fast- charging capability, and high safety.

Mixed niobium oxides (MNO) were first identified as potential battery materials in the academic literature in the 1980's [Cava et al. (1983); Cava et al. (1984)], but generated limited interest at the time because of the lack of commercially available cathodes to match their rate performance.

Interest in MNO anodes was revived in the early 2010's, with the demonstration of a practical cell combining a $TiNb_2O_7$ anode and a commercially-available LNMO cathode showing promising performance in terms of rate capability, cycle life, and energy density [Goodenough and Park (2013)]. Selected MNO anodes such as $TiNb_2O_7$ offer characteristics that are similar to LTO in terms of high operating potential vs. Li/Li+ (1.6V) and low volume expansion (<5%) leading to safe fast-charge and long cycle life (>10, 000 cycles). A key advantage of MNO anodes is that specific capacities significantly higher than LTO can be achieved (e.g. c. 300 mAh/g for $TiNb_2O_7$), which improves cell energy density. However, electronic conductivities are typically too low in MNO materials such as $TiNb_2O_7$ to sustain fast charge rates without particle engineering and carbon coatings, which is a limitation similar to that of LTO.

On the other hand, it was recently shown that other MNOs such as $Nb_2O_5$, also studied in the 1980's for batteries, which typically have a so-called "Wadsley-Roth" or "bronze" crystal structure, can offer extremely fast lithium ion diffusion rates $10^{-14}$–$10^{-10}$ $cm^2 s^{-1}$ (LTO typically $10^{-17}$ $cm^2 S^{-1}$) [Griffith et al. (2016)]. This can potentially improve on electrode density (i.e. >2.5 $g/cm^3$), and thus in volumetric capacity (>600 $mAh/cm^3$) and cell energy density. However, several challenges limit the commercial deployment of these materials, such as low electronic conductivity, lifetime issues as a "micromaterial" (crystals on the order of 1-10 μm in size), and "sloping" lithiation voltage profiles. A lithiation voltage profile refers to the shape of the anode potential vs. amount of lithium inserted in the anode. LTO and $TiNb_2O_7$ have a "flat" voltage profile whereas materials such as $Nb_2O_5$ typically have a "sloping" voltage profile. Voltage profiles that are too sloping lead to large voltage windows which make full cell balancing challenging in a commercial cell.

$TiNb_2O_7$ in particular has further limitations to its application in high power battery technologies. It has a limited Li-ion diffusion rate ($8.0 \times 10^{-16}$ $cm^2 s^{-1}$) as compared to other MNOs (eg. $Nb_{12}MoO_{33}$=$4.0 \times 10^{-14}$ $cm^2 s^{-1}$) [Zhu 2019], which limits its performance at high power. In particular this limits the utilisation of the pseudocapacitive charge storage mechanism, a key benefit to the use of MNOs for high power [Yang 2017].

U.S. Pat. No. 9,515,319B2 discusses $TiNb_2O_7$ and contemplates but does not exemplify modifications of this material. However the feedstocks and processes used in this disclosure are expensive (furnace treatments to 1500° C. up to 50 h), and the materials produced show low initial Coulombic efficiency (84.7%, 86.5%). US2015/0270543A1 and KR20150131800A disclose modifying $TiNb_2O_7$.

US2019/0288283A1 discloses a lithium niobium composite oxide where as an essential feature some of the niobium must be replaced by at least one element selected from Fe, Mg, Al, Cu, Mn, Co, Ni, Zn, Sn, Ti, Ta, V, and Mo.

The present invention has been devised in light of the above considerations.

SUMMARY OF THE INVENTION

The present inventors have realised that, despite the apparent challenges presented by the prior art, it is possible to provide an active electrode material which overcomes some or all of the problems presented by prior art materials discussed above.

Accordingly, in a first aspect, the present invention provides an active electrode material expressed by the general formula $[M1]_x[M2]_{(1-x)}[Nb]_y[O]_z$, wherein:

M1 and M2 are different;

M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd;

M2 represents one or more of Mg, V, Cr, W, Zr, Mo, Cu, Ga, Ge, Ca, K, Ni, Co, Al, Sn, Mn, Ce, Sb, Y, La, Hf, Ta, Zn, In, or Cd; and wherein x satisfies $0 < x < 0.5$;

y satisfies $0.5 \leq y \leq 49$ z satisfies $4 \leq z \leq 124$.

A material in which M1 and M2 are different can also be referred to as a mixed cation active materials, or a complex oxide active material. These terms are used interchangeably in the present disclosure to refer to a material of the general formula as set out above. Such materials may offer improved electrochemical properties in comparison to non-mixed cation active materials (e.g. materials having the general formula $[M]_x[Nb]_y[O]_z$, where M represents a single ion.

In particular, as shown by the examples, the inventors have found that by substituting the non-Nb cation to form a mixed cation structure the entropy can increase in the crystal structure, reducing potential energy barriers to Li ion diffusion through minor defect introduction. Modification by creating mixed cation structures that retain the same overall oxidation state as the unmodified crystal structure demonstrate the potential improvements by altering ionic radii, which can cause minor changes in crystal parameters and Li-ion cavities that can improve electrochemical properties. For example, by substituting with a cation of larger ionic radius, the unit cell can be expanded versus the unmodified structure, which can result in higher Li ion diffusion rates. Modification by creating mixed cation structures that result in increased oxidation state demonstrate similar potential advantages with altered ionic radii, compounded by introduction of additional electron holes in the structure to aid in electrical conductivity. Modification by creating mixed cation structures that result in decreased oxidation state demonstrate similar potential advantages with altered ionic radii, compounded by introduction of oxygen vacancies and additional electrons in the structure to aid in electrical conductivity. Modification by inducing oxygen deficiency from high temperature treatment in inert or reducing conditions provides a reduced structure of much improved electrical conductivity. Combination of mixed cation structures and induced oxygen deficiency allows multiple beneficial effects.

As set out above, M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd. M2 represents one or more of Mg, V, Cr, W, Zr, Mo, Cu, Ga, Ge, Ca, K, Ni, Co, Al, Sn, Mn, Ce, Sb, Y, La, Hf, Ta, Zn, In, or Cd. By 'represents one or more of', it is intended that either M1 or M2 may each represent two or more elements from their respective lists. An example of such a material is $Ti_{0.05}W_{0.25}Mo_{0.70}Nb_{12}O_{33}$. Here, M1 represents $Ti_{x'}W_{x''}$ (where x'+x"=x), M2 represents Mo, x=0.3, y=12, z=33. Another example of such a material is $T_{0.05}Zr_{0.05}W_{0.25}Mo0.65Nb_{12}O_{33}$. Here, M1 represents $Ti_{x'}Zr_{x''}W_{x'''}$ (where x'+x"+x'''=x), M2 represents Mo, x=0.35, y=12, z=33.

Optionally M1 represents one or more of K, Mg, Ca, Y, Ti, Zr, Hf, V, Ta, Cr, Mo, W, Mn, Fe, Co, Ni, Cu, Zn, Al, Ga, Si, Ge, Sn, Sb. M1 may represent one or more of Ti, Mg, V, Cr, W, Zr, Mo, Cu, Ga, Ge, K, Ni, Al, Hf, Ta, or Zn. Preferably, M1 represents one or more of Ti, Mg, V, Cr, W, Zr, Mo, Ga, Ge, Al, or Zn.

M2 does not represent Ti. In other words, preferably, Ti is not the major non-Nb cation in the active electrode material. Where M1 represents Ti alone, preferably x is 0.05 or less. Where M1 represents one or more cations including Ti, preferably the amount of Ti relative to the total amount of non-Nb cations is 0.05:1 or less.

Optionally M2 is selected from one or more of Mo, W, V, Zr, Al, Zn, Ga, Ge, Ta, Cr, Cu, K, Mg, Ni, or Hf, M2 may be selected from one or more of Mo, W, V, Zr, Al, Zn, Ga, or Ge. Preferably, M2 is selected from one or more of Mo, W, V, or Zr. The present inventors have found that when M2 is selected from one of these elements, the active electrode material may have improved electrochemical properties. M2 may consist of a single element.

As x satisfies $0<x<0.5$, M2 is the major non-Nb cation in the active electrode material. Preferably x satisfies $0.01 \leq x \leq 0.4$, more preferably x satisfies $0.05 \leq x \leq 0.25$, for example, x may be about 0.05.

The precise values of y and z within the ranges defined may be selected to provide a charge balanced, or substantially charge balanced, crystal structure. Additionally or alternatively, the precise values of y and z within the ranges defined may be selected to provide a thermodynamically stable, or thermodynamically metastable, crystal structure.

In some cases, z may be defined in the format $z=(z'-z'\alpha)$, where $\alpha$ is a non-integer value less than 1, for example where $\alpha$ satisfies $0 \leq \alpha \leq 0.05$. $\alpha$ may be greater than 0, i.e. $\alpha$ may satisfy $0 \leq \alpha \leq 0.05$. When $\alpha$ is greater than 0, the active electrode material is an oxygen deficient material, i.e. the material has oxygen vacancies. Such a material would not have precise charge balance, but is considered to be "substantially charge balanced" as indicated above. Alternatively, $\alpha$ may equal 0, in which case the material is not an oxygen deficient material.

When $\alpha$ is 0.05, the number of oxygen vacancies is equivalent to 5% of the total oxygen in the crystal structure. In some embodiments, $\alpha$ may be greater than 0.001 (0.1% oxygen vacancies), greater than 0.002 (0.2% oxygen vacancies), greater than 0.005 (0.5% oxygen vacancies), or greater than 0.01 (1% oxygen vacancies). In some embodiments, $\alpha$ may be less than 0.04 (4% oxygen vacancies), less than 0.03 (3% oxygen vacancies), less than 0.02 (2% oxygen vacancies), or less than 0.1 (1% oxygen vacancies). For example, $\alpha$ may satisfy $0.001 \leq \alpha \leq 0.05$. When the material is oxygen deficient, the electrochemical properties of the material may be improved, for example, resistance measurements may show improved conductivity in comparison to equivalent non-oxygen deficient materials. As will be understood, the percentage values expressed here are in atomic percent.

The oxygen deficiency (e.g. expressed as the percentage of oxygen vacancies) in a material can be measured by e.g. thermogravimetric analysis (TGA) in an oxygen-rich atmosphere, by measurement of how the mass of the sample changes over time due to re-inclusion of oxygen in the oxygen vacancies.

Alternatively or additionally, the oxygen deficiency can be qualitatively measured by assessing the colour of a material relative to a non-oxygen deficient sample of the same material. For example, non-oxygen deficient $MoNb_{12}O_{33}$ has a white, off-white, or yellow colour. Oxygen-deficient $MoNb_{12}O_{<33}$ has a purple colour. On production of an oxygen deficient crystal of $MoNb_{12}O_{<33}$ a colour change from white/off-white/yellow to purple can be observed.

M1 may have an equal or lower oxidation state than M2. Preferably, M1 has a lower oxidation state than M2. When more than one element is present as M1 and/or M2 it will be understood that the oxidation state refers to M1 and/or M2 as a whole. For example, if 25 at% of M1 is Ti and 75 at% of M1 is W the oxidation state of M1 is 0.25×4 (the contribution from Ti)+0.75×6 (the contribution from W). Advantageously, when M1 has a lower oxidation state than M2 this is compensated for by the formation of oxygen vacancies, i.e. forming an oxygen deficient active electrode material. The presence of oxygen vacancies is believed to improve the conductivity of the active electrode material and to provide further benefits, as evidenced by the examples. Optionally, M1 comprises at least one cation with a 4+ oxidation state and M2 comprises at least one cation with a 6+ oxidation state. Optionally, M1 has an oxidation state of 4+ and M2 has an oxidation state of 6+. M1 preferably has a different ionic radius than M2, most preferably a larger ionic radius. This gives rise to changing unit cell size and local distortions in crystal structure. This is believed to improve electrochemical properties such as specific capacity and Coulombic efficiency through altering the Li ion site availability by varying cavity size and reduction of energy barriers to reversible lithiation. The ionic radii may be the Shannon ionic radii (available at R. D. Shannon, *Acta Cryst.*, A32, 1976, 751-76) at the coordination and valency that the ion would be expected to adopt in the crystal structure of the active electrode material.

The active electrode material may be material selected from the group consisting of:

(i) $M1_xMo_{(1-x)}Nb_{12}O_{(33-33\ \alpha)}$
$M1_xW_{(1-x)}Nb_{12}O_{(33-33\ \alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$
$M1_xZn_{(1-x)}Nb_{17}O_{(43.5-43.5\ \alpha)}$
$M1_xCu_{(1-x)}Nb_{17}O_{(43.5-43.5\ \alpha)}$
$M1_xAl_{(1-x)}Nb_{11}O_{(29-29\ \alpha)}$
$M1_xGa_{(1-x)}Nb_{11}O_{(29-29\ \alpha)}$
$M1_xGe_{(1-x)}Nb_{18}O_{(47-47\ \alpha)}$
$M1_xW_{(1-x)}Nb_{1.125}O_{(5.81-5.81\ \alpha)}$
$M1_xW_{(1-x)}Nb_{3.2}O_{(11-11\ \alpha)}$
$M1_xAl_{(1-x)}Nb_{49}O_{(124-124\ \alpha)}$
$M1_xGa_{(1-x)}Nb_{49}O_{(124-124\ \alpha)}$; or
(ii) $M1_xMo_{(1-x)}Nb_{12}O_{(33-33\ \alpha)}$
$M1_xW_{(1-x)}Nb_{12}O_{(33-33\ \alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$
$M1_xZn_{(1-x)}Nb_{17}O_{(43.5-43.5\ \alpha)}$
$M1_xAl_{(1-x)}Nb_{11}O_{(29-29\ \alpha)}$
$M1_xGe_{(1-x)}Nb_{18}O_{(47-47\ \alpha)}$; or preferably
(iii) $M1_xMo_{(1-x)}Nb_{12}O_{(33-33\ \alpha)}$
$M1_xW_{(1-x)}Nb_{12}O_{(33-33\ \alpha)}$
$M1_xV_{(1-x)}Nb_9O_{(25-25\ \alpha)}$
$M1_xZr_{(1-x)}Nb_{24}O_{(62-62\ \alpha)}$
$M1_xW_{(1-x)}Nb_{0.57}O_{(4.43-4.43\ \alpha)}$
$M1_xW_{(1-x)}Nb_{0.89}O_{(5.22-5.22\ \alpha)}$ where M1 represents one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein x satisfies $0<x<0.5$; and $\alpha$ satisfies $0 \leq \alpha \leq 0.05$.

In a particularly preferred aspect, the active electrode material is $M1_xMo_{(1-x)}Nb_{12}O_{(33-33 \alpha)}$. In another particularly preferred aspect, the active electrode material is $M1_xW_{(1-x)}Nb_{0.57}O_{(4.43-4.43 \alpha)}$. In another particularly preferred aspect, the active electrode material is $M1_xZn_{(1-x)}Nb_{17}O_{(43.5-43.5 \alpha)}$. In another particularly preferred aspect, the active electrode material is $M1_xAl_{(1-x)}Nb_{11}O_{(29-29 \alpha)}$. The examples show that these materials have particularly advantageous properties for use as active electrode materials.

The materials above in groups (i), (ii), and (iii) and in the particularly preferred aspects represent specific non-mixed cation active materials (i.e. when x=0) which have been modified into mixed cation active materials by the substitution of less than half of M2 by a different element M1. Optionally, in these materials, M2 may also be substituted by Nb on the non-Nb site of the crystal structure. That is, M1 can represent one or more of Ti, Mg, V, Cr, W, Zr, Mo, Cu, Fe, Ga, Ge, Ca, K, Ni, Co, Al, Sn, Mn, Ce, Te, Se, Si, Sb, Y, La, Hf, Ta, Re, Zn, In, Cd, or Nb. M1 can also represent further list of elements recited above and in the claims.

In a second aspect, the present invention provides an active electrode material expressed by the general formula $[M][Nb]_y[O]_z$; wherein the active electrode material is oxygen deficient; wherein M consists of one of Mg, Cr, W, Mo, Cu, Ga, Ge, Ca, K, Ni, Co, Al, Sn, Mn, Ce, Sb, Y, La, Hf, Ta, Zn, In, or Cd; y satisfies $0.5 \leq y \leq 49$; and z satisfies $4 \leq z \leq 124$.

Materials according to the second aspect of the invention are oxygen deficient analogues of known 'base' materials such as $MoNb_{12}O_{33}$, $WNb_{12}O_{31}$, $W_7Nb_8O_{31}$, and $W_9Nb_8O_{47}$. z may be defined as $z=(z'-z'\alpha)$ wherein a satisfies $0 \leq \alpha \leq 0.05$. The comments set out above in relation to materials according to the first aspect specifying possible ranges for $\alpha$ when z is defined as $z=(z'-z'\alpha)$ also apply here to materials of the second aspect of the invention. For example, $\alpha$ may satisfy $0.001 \leq \alpha \leq 0.05$. It has been found that oxygen deficient materials according to the second aspect have improved properties for use as active electrode materials compared to the stoichiometric 'base' materials. For example, the materials according to the second aspect have improved electrical conductivity.

M may consist of one of Mo, W, Al, Zn, Ga, Ge, Ta, Cr, Cu, K, Mg, Ni, or Hf; or M may consist of one of Mo, W, Al, Zn, Ga, or Ge; or preferably M may consist of one of Mo, W, Al, or Zn.

The active electrode material of the second aspect may be expressed by the general formula $[M]_x[Nb]_y[O]_{(Z'-z'\alpha)}$, selected from the group consisting of:

$MoNb_{12}O_{(33-33 \alpha)}$
$WNb_{12}O_{(33-33 \alpha)}$
$W_7Nb_4O_{(31-31 \alpha)}$
$W_9Nb_8O_{(47-47 \alpha)}$
$Zn_2Nb_{34}O_{(87-87 \alpha)}$
$Cu_2Nb_{34}O_{(87-87 \alpha)}$
$AlNb_{11}O_{(29-29 \alpha)}$
$GaNb_{11}O_{(29-29 \alpha)}$
$GeNb_{18}O_{(47-47 \alpha)}$
$W_{16}Nb_{18}O_{(93-93 \alpha)}$
$W_5Nb_{16}O_{(55-55 \alpha)}$
$AlNb_{49}O_{(124-124 \alpha)}$
$GaNb_{49}O_{(124-124 \alpha)}$
wherein $\alpha$ satisfies $0 < \alpha \leq 0.05$.

These represent specific stoichiometric mixed niobium oxides which have been modified into oxygen deficient mixed niobium oxides.

The active electrode material of the second aspect may be expressed by the general formula $[M]_x[Nb]_y[O]_{(Z'-z'\alpha)}$, selected from the group consisting of:

$MoNb_{12}O_{(33-33 \alpha)}$
$WNb_{12}O_{(33-33 \alpha)}$
$W_7Nb_4O_{(31-31 \alpha)}$
$W_9Nb_8O_{(47-47 \alpha)}$
$Zn_2Nb_{34}O_{(87-87 \alpha)}$
$AlNb_{11}O_{(29-29 \alpha)}$
$GaNb_{18}O_{(47-47 \alpha)}$
wherein $\alpha$ satisfies $0 < \alpha \leq 0.05$.

The active electrode material of the second aspect may be expressed by the general formula $[M]_x[Nb]_y[O]_{(Z'-z'\alpha)}$, selected from the group consisting of:

$MoNb_{12}O_{(33-33 \alpha)}$
$WNb_{12}O_{(33-33 \alpha)}$
$W_7Nb_4O_{(31-31 \alpha)}$
$W_9Nb_8O_{(47-47 \alpha)}$
wherein $\alpha$ satisfies $0 < \alpha \leq 0.05$.

Optionally, M is W. That is, the active electrode material may be expressed by the general formula $[W][Nb]_y[O]_z$. For example, the active electrode material may be selected from $WNb_{12}O_{(33-33 \alpha)}$, $W_7Nb_4O_{(31-31 \alpha)}$, $W_9Nb_8O_{(47-47 \alpha)}$, $W_{16}Nb_{18}O_{(93-93 \alpha)}$, and $W_5Nb_{16}O_{(55-55 \alpha)}$. The examples demonstrate that inducing oxygen deficiency in a number of different tungsten niobium oxides leads to improved properties, e.g. improved electrical conductivity, compared to the stoichiometric base oxides.

In a particularly preferred aspect, the active electrode material is $MoNb_{12}O_{(33-33 \alpha)}$. In another particularly preferred aspect, the active electrode material is $WNb_{12}O(33-33 \alpha)$. In another particularly preferred aspect, the active electrode material is $W_5Nb_{16}O_{(55-55 \alpha)}$. In another particularly preferred aspect, the active electrode material is $W_7Nb_4O_{(31-31 \alpha)}$. In another particularly preferred aspect, the active electrode material is $Zn_2Nb_{34}O_{(87-87 \alpha)}$. In another particularly preferred aspect, the active electrode material is $AlNb_{11}O_{(29-29 \alpha)}$. The examples show that these materials have particularly advantageous properties for use as active electrode materials.

The present inventors have found that by modifying materials such as $MoNb_{12}O_{33}$, $WNb_{12}O_{33}$, $ZrNb_{24}O_{62}$, $VNb_9O_{25}$, $W_7Nb_4O_{31}$, and $W_9Nb_8O_{47}$ by either incorporating multiple non-Nb cations to form mixed cation active materials/complex oxide active materials (as per the first aspect of the invention), and/or by creating an oxygen deficiency (as per the second aspect of the invention), it is possible to create active electrode materials having improved electrochemical properties, and in particular improved electrochemical properties when used as an anode material.

The specific capacity/reversible delithiation capacity of active electrode materials according to the invention may be 200 mAh/g or more, 225 mAh/g or more, 250 mAh/g or more, up to about 300 mAh/g or more. Here, specific capacity is defined as that measured in the 2nd cycle of a half cell galvanostatic cycling test at a rate of 0.05C with a voltage window of 1.1-3.0V vs Li/Li+. It may be advantageous to provide materials having a high specific capacity, as this can provide improved performance in an electrochemical device comprising the active electrode material.

Furthermore, active electrode materials according to the invention may have an appropriate voltage profile as measured in the $2^{nd}$ cycle of a half cell galvanostatic cycling test at a rate of 0.05C with a voltage window of 1.1-3.0V vs Li/Li+. That is, the capacity of the material may be between 2.0 V and 1.1 V upon lithiation >180 mAh/g, and the capacity of the material may be between 1.1 V and 2.0V upon delithiation >180 mAh/g.

When formulated or coated as an electrode (optionally with conductive carbon additive and binder materials), the bulk resistivity of active electrode materials according to the invention, may be 5 kΩ.cm or less, more preferably 2 kΩ.cm or less. Bulk resistivity can be a useful proxy measurement of the electronic conductivity of such materials. It may be advantageous to provide materials having a suitably low bulk resistivity, as this can provide improved performance in an electrochemical device comprising the active electrode material.

The direct current internal resistance (DCIR) and resultant area specific impedance (ASI) of the active electrode material when measured in a Li-ion half coin cell with the described electrode may be 90 Ω or less (for DCIR) and 170 Ω.cm$^2$ or less (for ASI). It may be advantageous to provide materials having a suitably low DCIR and/or ASI, as this can provide improved performance in an electrochemical device comprising the active electrode material. However, further improvements in DCIR/ASI values may be seen for e.g. carbon coated active electrode materials, or where the active electrode material is incorporated in a commercial power cell with a cathode, with an electrode which has been calendared and prepared in a typical known manner. When measured in such an arrangement in a coin cell, the inventors theorise that the ASI may be as low as e.g. 26 Ω.cm$^2$ or less.

Active electrode materials according to the invention may have a lithium diffusion rate of greater than $10^{-14}$cm$^2$s$^{-1}$. It may be advantageous to provide materials having a suitably high lithium diffusion rate, as this can provide improved performance in an electrochemical device comprising the active electrode material.

Active electrode materials according to the invention may have an electrode density of 2.5 g/cm$^3$ or more after calendaring. For example, electrode densities of up to 3.0 g/cm$^3$ or more after calendaring have been achieved. It may be advantageous to provide materials having such an electrode density, as this can provide improved performance in an electrochemical device comprising the active electrode material. Specifically, when the electrode density is high, high volumetric capacities can be achieved, as gravimetric capacity x electrode density×active material fraction=volumetric capacity.

The initial coulombic efficiency of active electrode materials according to the invention may be greater than 88%, more preferably greater than 90%. In some cases the initial coulombic efficiency of the active electrode material may be as high as 92% or more, 93% or more or 94% or more. It may be advantageous to provide materials having a suitably high initial coulombic efficiency, as this can provide improved performance in an electrochemical device comprising the active electrode material. Initial coulombic efficiency may be measured as the difference in the lithiation and de-lithiation capacity on the 1$^{st}$ charge/discharge cycle at C/10 in a half-cell.

Further optional features of the first and second aspects of the invention are set out below.

The crystal structure of the active electrode material of the first aspect, as determined by X-ray diffraction, may correspond to the crystal structure of the unmodified form of the active electrode material, wherein the unmodified form is expressed by the formula [M2][Nb]$_y$[O]$_z$ wherein M2 consists of a single element and wherein the unmodified form is not oxygen deficient, wherein the unmodified form is selected from one or more of: M2$^I$Nb$_5$O$_{13}$, M2$^I$Nb$_{10.8}$O$_{30}$, M2$^{II}_2$Nb$_{34}$O$_{87}$, M2$^{III}$Nb$_{11}$O$_{29}$, M2$^{III}$Nb$_{49}$O$_{124}$ (M2$^{III}_{0.5}$Nb$_{24.5}$O$_{62}$), M2$^{IV}$Nb$_{24}$O$_{62}$, M2$^{IV}$Nb$_2$O$_7$, M2$^{IV}_2$Nb$_{10}$O$_{29}$, M2$^{IV}$Nb$_{14}$O$_{39}$, M2$^{IV}$Nb$_{14}$O$_{37}$, M2$^{IV}$Nb$_6$O$_{17}$, M2$^{IV}$Nb$_{18}$O$_{47}$, M2$^V$Nb$_9$O$_{25}$, M2$^V_4$Nb$_{18}$O$_{55}$, M2$^V_3$Nb$_{17}$O$_{50}$, M2$^{VI}$, Nb$_{12}$O$_{33}$, M2$^{VI}_4$Nb$_{26}$O$_{77}$, M2$^{VI}_9$Nb$_{14}$O$_{44}$, M2$^{VI}_5$Nb$_{16}$O$_{55}$, M2$^{VI}_8$Nb$_{18}$O$_{69}$, M2$^{VI}_{16}$Nb$_{18}$O$_{93}$, M2$^{VI}_{20}$Nb$_{22}$O$_{115}$, M2$^{VI}_9$Nb$_8$O$_{47}$, M2$^{VI}_{82}$Nb$_{54}$O$_{381}$, M2$^{VI}_{31}$Nb$_{20}$O$_{143}$, M2$^{VI}_7$Nb$_4$O$_{31}$, M2$^{VI}_{15}$Nb$_2$O$_{50}$, M2$^{VI}_3$Nb$_2$O$_{14}$, and M2$^{VI}_{11}$Nb$_2$O$_{63}$, wherein the numerals I, II, III, IV, V, and VI represent the oxidation state of M2. In this way, it can be confirmed that the unmodified form has been modified without significantly affecting the crystal structure.

The crystal structure of the active electrode material of the second aspect, as determined by X-ray diffraction, may correspond to the crystal structure of the unmodified form of the active electrode material, wherein the unmodified form is expressed by the general formula [M][Nb]$_y$[O]$_z$ wherein the unmodified form is not oxygen deficient, wherein the unmodified form is selected from M2$^I$Nb$_5$O$_{13}$, M2$^I_6$Nb$_{10.8}$O$_{30}$, M2$^{II}$Nb$_2$O$_6$, M2$^{II}_2$Nb$_{34}$O$_{87}$, M2$^{III}$Nb$_{11}$O$_{29}$, M2$^{III}$Nb$_{49}$O$_{124}$, M2$^{IV}$Nb$_{24}$O$_{62}$, M2$^{IV}$Nb$_2$O$_7$, M2$^{IV}_2$Nb$_2$Nb$_{10}$O$_{29}$, M2$^{IV}_2$Nb$_{14}$O$_{39}$, M2$^{IV}$Nb$_6$O$_{17}$, M2$^{IV}$Nb$_6$O$_{17}$, M2$^{IV}$Nb$_{18}$O$_{47}$, M2$^V$Nb$_9$O$_{25}$, M2$^V_4$Nb$_{18}$O$_{55}$, M2$^V_3$Nb$_{17}$O$_{50}$, M2$^{VI}$Nb$_{12}$O$_{33}$, M2$^{VI}_4$Nb$_{26}$O$_{77}$, M2$^{VI}_9$Nb$_{14}$O$_{44}$, M2$^{VI}_5$Nb$_{16}$O$_{55}$, M2$^{VI}_8$Nb$_{18}$O$_{69}$, M2$^{IV}$Nb$_2$O$_8$, M2$^{VI}_{16}$Nb$_2$O$_8$, M2$^{VI}_{16}$Nb$_{18}$O$_{93}$, M2$^{VI}_{20}$Nb$_{22}$O$_{115}$, M2$^{VI}_9$Nb$_8$O$_{47}$, M2$^{VI}_{82}$Nb$_{54}$O$_{381}$, M2$^{VI}_{31}$Nb$_{20}$O$_{143}$, M2$^{VI}_7$Nb$_4$O$_{31}$, M2$^{VI}_{15}$Nb$_2$O$_{50}$, M2$^{VI}_{31}$Nb$_{20}$O$_{50}$, M2$^{VI}_{31}$Nb$_{20}$, O$_{143}$, M2$^{VI}_7$Nb$_2$O$_{14}$, and M2$^{VI}_{11}$Nb$_{12}$O$_{63}$, wherein the numerals I, II, III, IV, V, and VI represent the oxidation state of M. In this way, it can be confirmed that the unmodified form has been modified without significantly affecting the crystal structure.

The crystal structure of the active electrode material, as determined by X-ray diffraction analysis, may correspond to the crystal structure of one or more of:

(i) MoNb$_{12}$O$_{33}$
WNb$_{12}$O$_{33}$
VNb$_9$O$_{25}$
ZrNb$_{24}$O$_{62}$
W$_7$Nb$_4$O$_{31}$
W$_9$Nb$_8$O$_{47}$
Zn$_2$Nb$_{34}$O$_{87}$
Cu$_2$Nb$_{34}$O$_{87}$
AlNbNb$_{11}$O$_{29}$
GaNb$_{11}$O$_{29}$
GeNb$_{18}$O$_{47}$
W$_{16}$Nb$_{18}$O$_{93}$
W$_5$Nb$_{16}$O$_{55}$
AlNb$_{49}$O$_{124}$
GaNb$_{49}$O$_{124}$; or
(ii) MoNb$_{12}$O$_{33}$
WNb$_{12}$O$_{33}$
VNb$_9$O$_{25}$
ZrNb$_{24}$O$_{62}$
W$_4$Nb$_7$O$_{31}$
W$_9$Nb$_8$O$_{47}$
Zn$_2$Nb$_{34}$O$_{87}$
AlNb$_{11}$O$_{29}$
GeNb$_{18}$O$_{47}$; or preferably
(iii) MoNb$_{12}$O$_{33}$
WNb$_{12}$O$_{33}$
ZrNb$_{24}$O$_{62}$
VNb$_9$O$_{25}$
W$_7$Nb$_4$O$_{31}$
W$_9$Nb$_8$O$_{47}$.

Here the term 'corresponds' is intended to reflect that peaks identified by X-ray diffraction analysis of the active electrode material may be shifted by no more than 0.5 degrees (preferably shifted by no more than 0.2 degrees, more preferably shifted by no more than 0.1 degrees) from corresponding peaks in an X-ray diffraction analysis of one or more of the reference crystal structure (e.g. $MoNb_{12}O_{33}$, $WN12O_{33}$, $ZrNb_{24}O_{62}$, $VNb_9O_{25}$, $W_7Nb_4O_{31}$, and/or $W_9Nb_8O_{47}$). Preferably the crystal structure of the active electrode material does not correspond to the crystal structure of $TiNb_2O_7$, for example, preferably the measured XRD diffraction pattern of the active electrode material does not correspond to the JCPDS crystallography database entry database 00-039-1407, for $TiNb_2O_7$. Optionally, the crystal structure of the active electrode material does not correspond to the crystal structure of $Ti2Nb_{10}O_{29}$. Optionally, the crystal structure of the active electrode material does not correspond to the crystal structure of $M^{III}Nb_{11}O_{29}$ for example $FeNb_{11}O_{29}$, $GaNb_{11}O_{29}$, $CrNb_{11}O_{29}$, and $AlNb_{11}O_{29}$.

At least some of the active electrode material may have a Wadsley-Roth crystal structure and/or a tetragonal tungsten bronze (TTB) crystal structure. Preferably, the majority of the active electrode material has a Wadsley-Roth crystal structure and/or a tetragonal tungsten bronze (TTB) crystal structure, for example, at least 50%, at least 60%, at least 70%, at least 80% or at least 90% of the active electrode material by volume may have a Wadsley-Roth crystal structure and/or a tetragonal tungsten bronze (TTB) crystal structure. In preferred embodiments, substantially all of the active electrode material may have a Wadsley-Roth crystal structure and/or a tetragonal tungsten bronze (TTB) crystal structure. When the material has such a crystal structure it may have improved electrochemical properties.

The crystal formula of a charge balanced and thermodynamically stable Wadsley-Roth crystal structure obeys the following formula:

$$(M_1, M_2, M_3, \ldots)_{mnp+1}O_{3-(m+n)p+4} \qquad (1)$$

In this formula, O is oxygen (the anion) and M (the cation) is any combination of elements selected from Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd. In materials according to the invention, at least one of (M1, M2, M3 . . . ) comprises Nb.

Formula (1) is based on crystal topography: m and n are the dimensions of the formed edge sharing superstructure blocks, ranging from 3-5 (integers). At the corner, blocks are connected into infinite ribbons (p=∞) only by edge-sharing, into pairs (p=2) by partly edge-sharing and partly tetrahedra or into isolated blocks only by tetrahedra (p=1). When p is infinity the formula becomes:

$$(M_1, M_2, M_3, \ldots)_{mn}O_{3mn-(m+n)} \qquad (2)$$

Together, formula (1) and (2) define the full composition samples for Wadsley-Roth crystal structures. Preferably the total crystal composition should also be charge neutral and thermodynamically favourable.

More information can be found in work by Griffith et al. (2017).

Reference to tetragonal tungsten bronze (TTB) crystal structures (or simply 'bronze' structures) in the present disclose refers to tetragonal tungsten bronze (TTB) structures with partially filled tunnels. As described in Montemayor 1998, such phases consist in a framework of $NbO_6$ octahedra sharing corners linked in such a way that three, four and five sided tunnels are formed. A number of 5-sided tunnels are filled with W, Nb, O, or a suitable metal cation to form the structure.

The active electrode material may further comprise Li and/or Na. In other words, the active electrode material may be a lithiated and/or a sodiated active electrode material. The active electrode material of the first aspect may be expressed by the general formula $[Li]_\lambda[M1]_x[M2]_{(1-x)}[Nb]_y[O]_z$ or $[Na]_\lambda[M1]_x[M2]_{(1-x)}[Nb]_y[O]_z$. The active electrode material of the second aspect may be expressed by the general formula $[Li]_\lambda[M][Nb]_y[O]_z$ or $[Na]_\lambda[M][Nb]_y[O]_z$. x, y, and z satisfy the ranges discussed above, and $\lambda$ is selected to provide a charge balanced, or substantially charge balanced, crystal structure, and/or a thermodynamically stable, or thermodynamically metastable, crystal structure.

The active electrode material may have a BET surface area in the range of 0.1-100 $m^2/g$, or 0.5-50 $m^2/g$, or 1-20 $m^2/g$. In general, a low BET surface area is preferred in order to minimise the reaction of the active electrode material with the electrolyte, e.g. minimising the formation of solid electrolyte interphase (SEI) layers during the first charge-discharge cycle of an electrode comprising the material. However, a BET surface area which is too low results in unacceptably low charging rate and capacity due to the inaccessibility of the bulk of the active electrode material to metal ions in the surrounding electrolyte. The term "BET surface area" refers to the surface area per unit mass calculated from a measurement of the physical adsorption of gas molecules on a solid surface, using the Brunauer—Emmett—Teller theory. For example, BET surface areas can be determined in accordance with ISO 9277:2010.

The active electrode material may comprise a plurality of primary crystallites (sometimes referred to as microcrystals or microcrystallites). The average diameter of the primary crystallites may be from 10 nm to 10 μm, preferably from 100 nm to 5 μm, although the most desirable diameter for the primary crystallites may depend on their intended use. For example, where the active electrode material is intended for use in ultra-high power products, it may be advantageous for the primary crystallite size to be low, e.g. 50 nm or less, or 30 nm or less. Where the active electrode material is intended for use in developing "high energy power cells", it may be advantageous for the crystallite size to be higher, e.g. 5 μm or more, or 7 μm or more.

Some or all of these primary crystallites may be agglomerated into secondary particles. Alternatively, the primary crystallites may be substantially non-agglomerated. Where some or all of these primary crystallites are agglomerated into secondary particles, the average diameter of the secondary particles (for example, the $D_{50}$ diameter when measured using solid state powder laser diffraction) is from 1 μm to 30 μm, preferably from 2 μm to 15 μm, although the most desirable diameter for the secondary particles may depend on their intended use. For example, where the active electrode material is intended for use in ultra-high power products, it may be advantageous for the secondary particle size to be low, e.g. 4 μm or less, 2 μm or less, or 1.5 μm or less. Where the active electrode material is intended for use in developing "high energy power cells", it may be advantageous for the secondary particle size to be higher, e.g. 8 μm or more, 12 μm or more, or 15 μm or more. The secondary particles may be porous.

The average diameter of the primary crystallites and/or the secondary particles may be measured using any conventional known technique, for example using SEM imaging to examine a sample of the material, selecting a number (n) of primary crystallites and/or secondary particles, and calculating the average diameter as the mean diameter of the n primary crystallites/secondary particles measured, e.g. where n equals 30.

An alternative method for measuring the secondary particle size is using solid state powder laser diffraction, for example using a Horiba laser diffraction particle analyser for dry powder with air pressure maintained at 0.3 MPa.

The active electrode material may have a $D_{10}$ secondary particle diameter when measured using solid state powder laser diffraction of at least 0.05 μm, or at least 0.1 μm, or at least 0.5 μm, or at least 1 μm. By maintaining a $D_{10}$ particle diameter within these ranges, the potential for parasitic reactions in a Li ion cell is reduced from having reduced surface area, and it is easier to process with less binder in the electrode slurry. The term "$D_n$" refers to the diameter below which n % by volume of the particle population is found.

The active electrode material may have a $D_{50}$ secondary particle diameter when measured using solid state powder laser diffraction of <50 μm, <20 μm, <10 μm, or <5 μm. By maintaining a $D_{90}$ particle diameter within these ranges, the proportion of the particle size distribution with large particle sizes is minimised, making the material easier to manufacture into a homogenous electrode.

The active electrode material may comprise a carbon coating formed on the surface of the primary crystallites and/or secondary particles. Some suitable methods for forming carbon coatings on the surface of the primary crystallites and/or secondary particles are set out in literature e.g. Zhou (2012). Other suitable methods are described below. The carbon coating may be present in an amount of up to 5 w/w%, based on the total weight of the active electrode material. The carbon coating may comprise graphitic carbon.

Where the active electrode has a morphology of a plurality of primary crystallites where some or all of these primary crystallites are agglomerated into porous secondary particles, the secondary particles may comprise a coating of carbon formed at least at the surfaces of pores in the secondary particles.

In a third aspect, the present invention provides an electrochemical device comprising an anode, a cathode and an electrolyte disposed between the anode and the cathode, wherein the anode comprises an electrode active material according to the first or second aspect of the invention.

The electrolyte may be a liquid electrolyte. Alternative or additionally the electrolyte may be a solid state electrolyte.

The anode may further comprise a conductive additive and/or a binder. For example, the anode may have a composition of about 80 wt % active material, about 10 wt % conductive additive, and about 10 wt % binder. Alternatively the anode may have a composition of about 91 wt % active material, about 5 wt % conductive additive, and about 4 wt % binder. The amount of active electrode material in the anode may be in a range from 70 wt % to 99 wt %, more preferably in a range from 75 wt % to 98 wt %, even more preferably in a range from 85 wt % to 96 wt %.

In a fourth aspect, the present invention provides a use of an electrode active material according to the first or second aspect of the invention as an anode active material, or a component of an anode active material, in an anode in conjunction with a cathode and an electrolyte in: (i) a lithium ion battery for charging and discharging of the lithium ion battery; or (ii) a sodium ion battery for charging and discharging of the sodium ion battery.

In a fifth aspect, the present invention provides a method for processing an electrode active material according to the first or second aspects of the invention as or in an anode active material for: (i) a lithium ion battery, wherein the method includes diffusing lithium ions into the anode active material; or for (ii) a sodium ion battery, wherein the method includes diffusing sodium ions into the anode active material.

In a sixth aspect, the present invention provides a method of making an active electrode material according to the first or second aspect of the invention, the method comprising steps of:

providing one or more precursor materials;
    mixing said precursor materials to form a precursor material mixture; and
    heat treating the precursor material mixture in a temperature range from 400° C.-1350° C. to form the active electrode material.

Where it is desired to make a material according to the first aspect of the invention, preferably the one or more precursor materials includes an M1 ion source, an M2 ion source, and a source of Nb.

Where it is desired to make a material according to the second aspect of the invention, preferably, the one or more precursor materials includes a source of M and a source of Nb.

The phrase 'M1 ion source' is used herein to describe a material comprising M1 ions/atoms. The phrase 'M2 ion source' is used herein to describe a material comprising M2 ions/atoms. For example, the phrase 'a source of Mo/W/Zr/ V/Nb' is used herein to describe a material comprising Mo/W/ZrN/Nb ions/atoms, as appropriate.

The precursor materials may include one or more metal oxides, metal hydroxides, metal salts or oxalates. For example, the precursor materials may include one or more metal oxides of different oxidation states and/or of different crystal structure. Examples of suitable metal oxide precursor materials include but are not limited to: $Nb_2O_5$, $NbO_2$, $WO_3$, $TiO_2$, $MoO_3$, $V_2O_5$, $ZrO_2$, and MgO. However, the precursor materials may not comprise a metal oxide, or may comprise ion sources other than oxides. For example, the precursor materials may comprise metal salts (e.g. $NO_3^-$, $SO_{3-}$) or other compounds (e.g. oxalates). Preferably the one or more precursor materials includes one or more of a Nb source, Mo source, a W source, a Zr source, and/or a V source.

Some or all of the precursor materials may be particulate materials. Where they are particulate materials, preferably they have an average particle size of <20 μm in diameter (for example, the $D_{50}$ diameter when measured using solid state powder laser diffraction). The average particle size may be in a range from e.g. 10 nm to 20 μm. Providing particulate materials with such an average particle size can help to promote more intimate mixing of precursor materials, thereby resulting in more efficient solid-state reaction during the heat treatment step. However, it is not essential that the precursor materials have an initial particle size of <20 μm in diameter, as the particle size of the one or more precursor materials may be mechanically reduced during the step of mixing said precursor materials to form a precursor material mixture.

The step of mixing/milling the precursor materials to form a precursor material mixture may be performed by a process selected from (but not limited to): dry or wet planetary ball milling, rolling ball milling, high shear milling, air jet milling, and/or impact milling. The force used for mixing/ milling may depend on the morphology of the precursor materials. For example, where some or all of the precursor materials have larger particle sizes (e.g. an average particle size of greater than 20 μm in diameter), the milling force may be selected to reduce the average particle size of the precursor materials such that the such that the average particle size of the precursor material mixture is reduced to 20 μm in diameter or lower. When the average particle size of particles in the precursor material mixture is 20 μm or less, this can promote a more efficient solid-state reaction of the precursor materials in the precursor material mixture during the heat treatment step.

The step of heat treating the precursor material mixture may be performed for a time of from 1 hour to 24 hours, more preferably from 3 hours to 14 hours. For example, the heat treatment step may be performed for 1 hour or more, 2 hours or more, 3 hours or more, 6 hours or more, or 12 hours or more. The heat treatment step may be performed for 24 hours or less, 18 hours or less, 14 hours or less, or 12 hours or less.

In some methods it may be beneficial to perform a two-step heat treatment. For example, the precursor material mixture may be heated at a first temperature for a first length of time, follow by heating at a second temperature for a second length of time. Preferably the second temperature is higher than the first temperature. Performing such a two-step heat treatment may assist the solid state reaction to form the desired crystal structure.

The step of heat treating the precursor material mixture may be performed in a gaseous atmosphere. The gaseous atmosphere may be an inert atmosphere, or may be a reducing atmosphere. Where it is desired to make an oxygen-deficient material, preferably the step of heat treating the precursor material mixture is performed in an inert or reducing atmosphere. Suitable gaseous atmospheres comprise: air, $N_2$, Ar, He, $CO_2$, CO, $O_2$, $H_2$, and mixtures thereof.

The method may include one or more post-processing steps after formation of the active electrode material.

In some cases, the method may include a post-processing step of heat treating the active electrode material, sometimes referred to as 'annealing'. This post-processing heat treatment step may be performed in a different gaseous atmosphere to the step of heat treating the precursor material mixture to form the active electrode material. The post-processing heat treatment step may be performed in an inert or reducing gaseous atmosphere. Such a post-processing heat treatment step may be performed at temperatures of above 500° C., for example at about 900° C. Inclusion of a post-processing heat treatment step may be beneficial to e.g. form deficiencies or defects in the active electrode material, for example to form oxygen deficiencies. Advantageously, the post-processing heat treatment step performed in an inert or reducing gaseous atmosphere may improve the electrical conductivity of the active electrode material. In this way, an active electrode material according to the second aspect can be synthesised.

In some cases, the method may include a post-processing step of mixing the active electrode material with a carbon source, and thereby forming a carbon coating on the active electrode material. Optionally, the mixture of the active electrode material and the carbon source may be heated to thereby form the carbon coating on the active electrode material. Suitable carbon sources include but are not limited to: carbohydrate materials (e.g. sugars, polymers); conductive carbons (e.g. carbon black); and/or aromatic carbon materials (e.g. pitch carbon).

One preferred method of forming a carbon coating includes a step of milling the active electrode material with a carbon source, followed by pyrolysis of the active electrode material and carbon source (e.g. in a furnace) under an inert or reducing atmosphere.

Another preferred method of forming a carbon coating includes mixing of the active electrode material with a carbon source, dispersion of the active electrode material and carbon source in an aqueous slurry, followed by spray drying. The resulting powder may optionally be pyrolysed. Where the carbon source is e.g. conductive carbon black, it is not necessary to pyrolyse the material post spray-drying.

In some cases, the method may include a post-processing step of milling the active electrode material to modify the active electrode material particle size. For example, the active electrode material may be treated by one or more processes including air jet milling, impact milling, high shear milling, sieving, or ball milling. This may provide a more suitable particle size for use in desired applications of the active electrode material.

In a further aspect, the invention provides the use of a dopant M1 for improving the properties of a base material for use as an active material for a metal-ion battery anode, wherein the base material has a structure $M2Nb_yO_z$ and wherein the dopant is used to provide a modified material $[M1]_x[M2]_{(1-x)}[Nb]_y[O]_z$, wherein the modified material has improved properties compared to the base material. An improved property may be improved initial coulombic efficiency (exemplified as the difference in the lithiation and de-lithiation capacity on the $1^{st}$ charge/discharge cycle at C/10 in a half-cell). An improved property may be improved capacity retention when comparing high rate charge/discharging with lower rates (exemplified as 5C or 10C vs 0.5C). An improved property may be improved specific capacity at low charge/discharge rates (exemplified herein at 0.1C). M1, M2, x, y, and z are as defined herein.

The invention includes the combination of the aspects and features described above except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1:
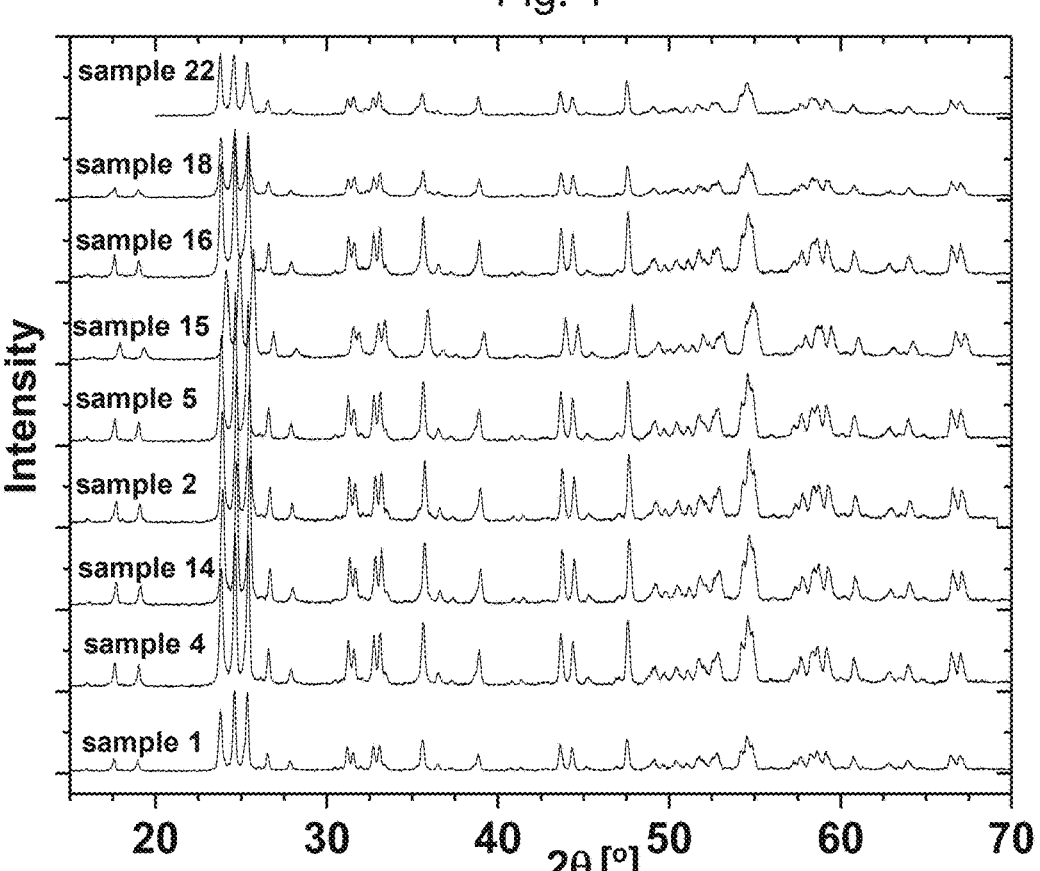
FIG. 1 shows XRD diffraction patterns of samples 1, 4, 14, 2, 5, 15, 16, 18 and 22.

Aspects and embodiments of the present invention will now be discussed with reference to the accompanying figures. Further aspects and embodiments will be apparent to those skilled in the art. All documents mentioned in this text are incorporated herein by reference.

A number of different materials were prepared and characterised, as summarised in Table 1, below. Broadly, these samples can be split into a number of groups:

Samples 1, 2, 3, 4, 5, 14, 15, 16, 18, and 22 belong to the same family of Wadsley-Roth phases based on $MoNb_{12}O_{33}$ ($M^{6+}Nb_{12}O_{33}$, 3×4 block of octahedra with a tetrahedron at each block corner). The blocks link to each other by edge sharing between $NbO_6$ octahedra, as well as corner sharing between $M^{6+}O_4$ tetrahedra and $NbO_6$ octahedra. Sample 1 is the base crystal structure, which is modified to a mixed metal cation structure by exchanging one or multiple cations in samples 2 to 4, and/or in a mixed crystal configuration (blending with isostructural $WNb_{12}O_{33}$) in samples 14, 15, 16, 18, and 22. Oxygen deficiencies are created in the base crystal in sample 5 and in the mixed metal cation structure 18. Sample 3 is a spray-dried and carbon-coated version of the crystal made in sample 2, and sample 22 is a spray-dried and carbon-coated version of the crystal made in sample 16.

Samples 6, 7, 17, 19, 20 belong to the same family of Wadsley-Roth phases based on $ZrNb_{24}O_{62}$ ($M^{4+}Nb_{24}O_{62}$, 3×4 block of octahedra with half a tetrahedron at each block corner).

Samples 8, 9 and E11 belong to the same family of Wadsley-Roth phases based on $WNb_{12}O_{33}$ ($M^{6+}Nb_{12}O_{33}$, a 3×4 $NbO_6$ octahedra block with a tetrahedron at each block corner).

Samples 10, 11 and 21 belong to the same family of Wadsley-Roth phases based on $VNb_9O_{25}$ ($M^{5+}Nb_9O_{25}$, a 3×3 NbOsoctahedra block with a tetrahedron at each block corner).

Samples 12, 13 and E14 belong to the same family of tungsten tetragonal bronzes (TTB) based on $W_7Nb_4O_{31}$ ($M^{6+}_7Nb_4O_{31}$). This is a tetragonal tungsten bronze structure, where $MO_6$ (M=0.4 Nb+0.6 W) octahedra are exclusively corner-sharing, with 3, 4, and 5 -sided tunnels. Some of these tunnels are filled with —O-M-O— chains whereas others are open for lithium ion transport and storage.

Samples E1, E2, E13 belong to the same family of Wadsley-Roth phases based on $Zn_2Nb_{34}O_{87}$ ($M^{2+}_2Nb_{34}O_{87}$). This orthorhombic phase consists out of 3×4 blocks of $MO_6$ octahedra ($M=Zn^{+2}/Nb^{+5}$), where the blocks are connected exclusively by edge-sharing and have no tetrahedra.

Samples E3, E4, E5, E12 belong to the same family of Wadsley-Roth phases based on $AlNb_{11}O_{29}$ ($M^{3+}Nb_{11}O_{29}$). The structure belongs to monoclinic shear structure with 3×4 octahedra blocks connected through exclusively edge-sharing and have no tetrahedra.

Samples E6, E7, E8 belong to the same family of Wadsley-Roth phases based on $GeNb_{18}O_{47}$ ($M^{4+}Nb_{18}O_{47}$). The structure is similar to sample 10 with 3×3 $NbO_6$ octahedra blocks and one tetrahedron connecting blocks at corners. However, the structure contains intrinsic defects due to $Ge^{+4}$ instead of $V^{5+}$.

Samples E9, E10 belong to the same family of Wadsley-Roth phases based on $W_5Nb_{16}O_{55}$ ($M^{6+}_5Nb_{16}O_{55}$). The structure is made of 4x5 blocks connected at the sides by edge-sharing (W,Nb)$O_6$ and connected at the corners by $WO_4$ tetrahedra. This structure is similar to Sample 8 and 9 but with a larger block size.

TABLE 1

A summary of different compositions synthesized.

| Sample No. | Composition | Material Synthesis |
|---|---|---|
| 1 * | $MoNb_{12}O_{33}$ | Solid state |
| 2 | $Ti_{0.05}Mo_{0.95}Nb_{12}O_{33}$ | Solid state |
| 3 | $Ti_{0.05}Mo_{0.95}Nb_{12}O_{33}$ + C | Solid state, spray dry, carbon pyrolysis |
| 4 | $Zr_{0.05}Mo_{0.95}Nb_{12}O_{33}$ | Solid state |
| 5 | $MoNb_{12}O_{<33}$ | Solid state |

TABLE 1-continued

A summary of different compositions synthesized.

| Sample No. | Composition | Material Synthesis |
|---|---|---|
| 6 * | $ZrNb_{24}O_{62}$ | Solid state |
| 7 | $V_{0.05}Zr_{0.95}Nb_{24}O_{62}$ | Solid state |
| 8 * | $WNb_{12}O_{33}$ | Solid state |
| 9 | $Ti_{0.05}W_{0.95}Nb_{12}O_{33}$ | Solid state |
| 10 * | $VNb_9O_{25}$ | Solid state |
| 11 | $Ti_{0.05}V_{0.95}Nb_9O_{25}$ | Solid state |
| 12 * | $W_7Nb_4O_{31}$ ($WNb_{0.57}O_{4.43}$) | Solid state |
| 13 | $Ti_{0.05}W_{0.95}Nb_{0.57}O_{4.43}$ ($Ti_{0.35}W_{6.65}Nb_4O_{31}$) | Solid state |
| 14 | $W_{0.25}Mo_{0.75}Nb_{12}O_{33}$ | Solid state |
| 15 | $Ti_{0.05}W_{0.25}Mo_{0.70}Nb_{12}O_{33}$ | Solid state |
| 16 | $Ti_{0.05}Zr_{0.05}W_{0.25}Mo_{0.65}Nb_{12}O_{33}$ | Solid state |
| 17 | $Ti_{0.05}Zr_{0.95}Nb_{24}O_{62}$ | Solid state |
| 18 | $Ti_{0.05}Zr_{0.05}W_{0.25}Mo_{0.65}Nb_{12}O_{<33}$ | Solid state |
| 19 | $Mo_{0.05}Zr_{0.95}Nb_{24}O_{62}$ | Solid state |
| 20 | $Mo_{0.05}V_{0.05}Zr_{0.95}Nb_{24}O_{62}$ | Solid state |
| 21 | $Mo_{0.05}V_{0.95}Nb_9O_{25}$ | Solid state |
| 22 | $Ti_{0.05}Zr_{0.05}W_{0.25}Mo_{0.65}Nb_{12}O_{33}$ + C | Solid state, spray dry, carbon pyrolysis |
| E1* | $Zn_2Nb_{34}O_{87}$ | Solid state |
| E2 | $Ge_{0.1}Zn_{1.9}Nb_{34}O_{87}$ | Solid state |
| E3* | $AlNb_{11}O_{29}$ | Solid state |
| E4 | $Fe_{0.05}Al_{0.95}Nb_{11}O_{29}$ | Solid state |
| E5 | $Ga_{0.05}Al_{0.95}Nb_{11}O_{29}$ | Solid state |
| E6* | $GeNb_{18}O_{47}$ | Solid state |
| E7 | $K_{0.02}Co_{0.02}Ge_{0.96}Nb_{18}O_{47}$ | Solid state |
| E8 | $K_{0.02}Co_{0.02}Ge_{0.96}Nb_{18}O_{47-\alpha}$ | Solid state |
| E9* | $W_5Nb_{16}O_{55}$ | Solid state |
| E10 | $W_5Nb_{16}O_{55-\alpha}$ | Solid state |
| E11 | $WNb_{12}O_{33-\alpha}$ | Solid state |
| E12 | $AlNb_{11}O_{29-\alpha}$ | Solid state |
| E13 | $Zn_2Nb_{34}O_{87-\alpha}$ | Solid state |
| E14 | $W_7Nb_4O_{31-\alpha}$ | Solid state |

Samples indicated with * are comparative samples.

Material Synthesis

Samples listed in Table 1 were synthesised using a solid-state route. In a first step, metal oxide precursor commercial powders ($Nb_2O_5$, $NbO_2$, $MoO_3$, $ZrO_2$, $TiO_2$, $WO_3$, $V_2O_5$, $ZrO_2$, $K2O$, $CoO$, $Fe_2O_3$, $GeO_2$, $Ga_2O_3$, $Al_2O_3$, $ZnO$ and/or $MgO$) were mixed in stochiometric proportions and planetary ball-milled at 550 rpm for 3h in a zirconia jar and milling media with a ball to powder ratio of 10:1. The resulting powders were then heated in a static muffle furnace in air in order to form the desired crystal phase. Samples 1 to 5 and 12 to 16, 18 and 22 were heat-treated at 900° C. for 12h; samples 6 to 9, 17, 19, and 20 were heat-treated at 1200° C. for 12h, with samples 6, 7, 17, 19 and 20 undergoing a further heat treatment step at 1350° C. for an additional 4h; samples 10, 11 and 21 were heat-treated at 1000° C. for 12h. Sample 3 and 22 were further mixed with a carbohydrate precursor (such as sucrose, maltodextrin or other water-soluble carbohydrates), dispersed in an aqueous slurry at concentrations of 5, 10, 15, or 20 w/w% with ionic surfactant, and spray-dried in a lab-scale spray-drier (inlet temperature 220° C., outlet temperature 95° C., 500 mL/h sample introduction rate). The resulting powder was pyrolyzed at 600° C. for 5h in nitrogen. Sample 5 and 18 were further annealed in nitrogen at 900° C. for 4 hours.

Samples E1, E2, E6, E7, E8, E9, E10 were prepared by ball milling as above, and impact milling at 20,000 rpm as needed to a particle size distribution with D90<20 μm, then heat-treated as in a muffle furnace in air at 1200° C. for 12 h; samples E8, E10, E11, E12, E13 were further annealed in nitrogen at 1000° C. for 4 h; E14 was annealed in nitrogen at 900° C. for 5 h. Samples E3, E4, E5 were heat-treated at 1300° C. for 12 h. Samples E1-E10 were de-agglomerated after synthesis by impact milling or jet milling to the desired particle size ranges.

Elemental Analysis of Samples

Elemental analysis was carried out by Inductively-Coupled Plasma-Optical Emission Spectroscopy (ICP-MS/OES). The measurements were carried out on a Thermo Scientific ICP-OES Duo iCAP 7000 series. The samples were digested using 5 ml Nitric acid and 1 ml HF acid and an internal standard was used to account for any instrumental variation. In this process the plasma is used to vaporise the material into its atomic/ionic state of elements. The atoms are in excited state due to high temperature and the decay to normal state through energy transitions. The characteristic radiation emitted by each excited ion is measured for analysis. The results are set out in Table 2, below.

TABLE 2

Summary of ICP-OES elemental analysis results for samples 1, 2, 4, 14, 3, 16, 9, 11, and 17

| Sample | Composition | Elemental ratio | Expected | Measured |
|---|---|---|---|---|
| 1* | $MoNb_{12}O_{33}$ | Nb/Mo | 12 | 12 |
| 2 | $Ti_{0.05}Mo_{0.95}Nb_{12}O_{33}$ | Mo/Ti | 19 | 18 |
| 4 | $Zr_{0.05}Mo_{0.95}Nb_{12}O_{33}$ | Mo/Zr | 19 | 18 |
| 14 | $W_{0.25}Mo_{0.75}Nb_{12}O_{33}$ | Mo/W | 3 | 3.1 |
| 3 | $Ti_{0.05}Mo_{0.95}Nb_{12}O_{33}$ + C | Mo/Ti | 19 | 18 |
| 16 | $Ti_{0.05}Zr_{0.05}W_{0.25}Mo_{0.65}Nb_{12}O_{33}$ | Mo/Zr; Mo/Ti | 13; 13 | 11.4; 13.5 |
| 9 | $Ti_{0.05}W_{0.95}Nb_{12}O_{33}$ | W/Ti | 19 | 18 |
| 11 | $Ti_{0.05}V_{0.95}Nb_9O_{25}$ | V/Ti | 19 | 19 |
| 17 | $Ti_{0.05}Zr_{0.95}Nb_{24}O_{62}$ | Zr/Ti | 19 | 19 |

This table of elemental analysis demonstrates that substantially the expected cation ratio has been achieved for each composition tested.

XRD Characterisation of Samples

The phase purity of some samples was analysed using Rigaku Miniflex powder X-ray diffractometer in 2 θ range (10-70°) at 1°/min scan rate.

FIG. 1 shows the measured XRD diffraction patterns for samples 1, 4, 14, 2, 5, 15, 16, 18, 22 which are relevant to Comparative Study A. All diffraction patterns have peaks at the same locations (within instrument error, that is 0.1°), and match JCPDS crystallography database entry JCPDS 73-1322, which corresponds to $MoNb_{12}O_{33}$. There is no amorphous background noise and the peaks are sharp and intense. This means that all samples are phase-pure and crystalline, with crystallite size ~200 nm according to the Scherrer equation and crystal structure matching $MoNb_{12}O_{33}$.

Figure 2:
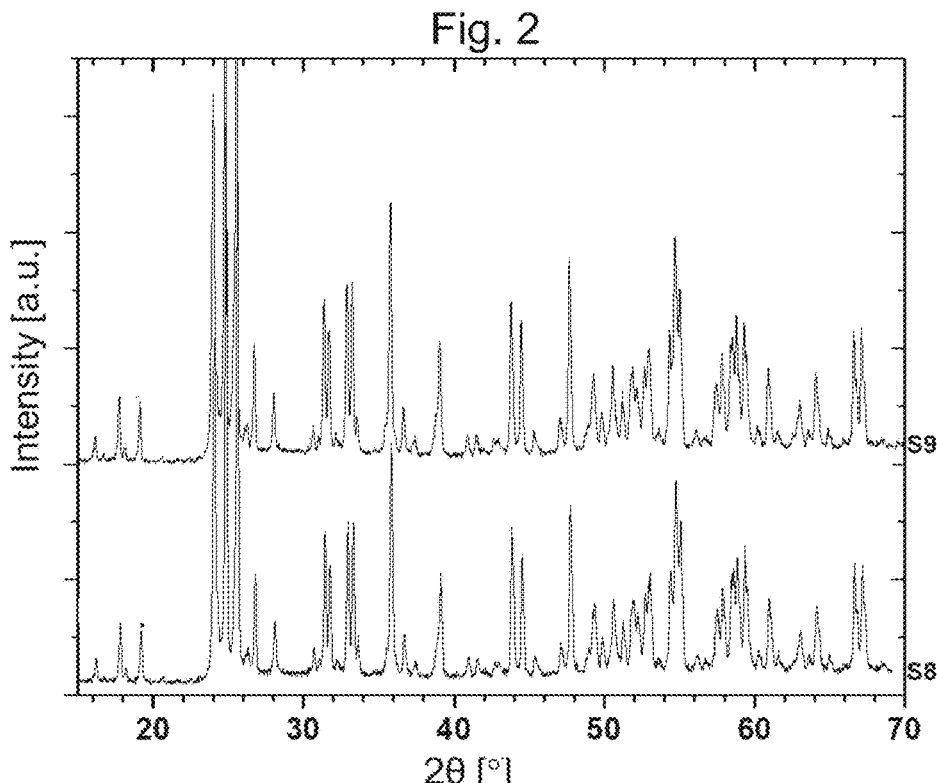
FIG. 2 shows XRD diffraction patterns of samples 8 and 9.
Figure 29:
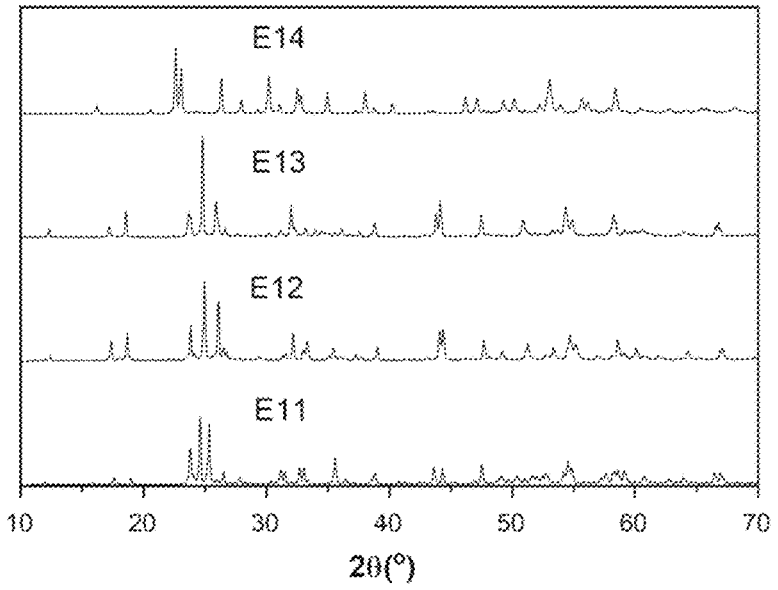
FIG. 29 shows XRD diffraction patterns of E11-E14.

FIG. 2 shows the measured XRD diffraction patterns for samples 8 and 9. FIG. 29 shows the XRD pattern for sample E11. All diffraction patterns have peaks at the same locations (within instrument error, that is 0.1°), and match JCPDS crystallography database entry JCPDS 73-1322, which corresponds to $WNb_{12}O_{33}$. There is no amorphous background noise and the peaks are sharp and intense. This means that all samples are phase-pure and crystalline, with crystallite size ~200 nm according to the Scherrer equation and crystal structure matching $WNb_{12}O_{33}$.

Figures 3, 4:
FIG. 3 shows XRD diffraction patterns of samples 6, 7, 17, 19 and 20.
FIG. 4 shows XRD diffraction patterns of samples 10, 11 and 21.

FIG. 3 shows the measured XRD diffraction patterns for samples 6, 7, 17, 19, 20 which are relevant to Comparative Study B. All diffraction patterns have peaks at the same locations (within instrument error, that is 0.1°), and match JCPDS crystallography database entry JCPDS 01-072-1655, which corresponds to $ZrNb_{24}O_{62}$. There is no amorphous background noise and the peaks are sharp and intense. This means that all samples are phase-pure and crystalline, with crystallite size ~200 nm according to the Scherrer equation and crystal structure matching $ZrNb_{24}O_{62}$.

FIG. 4 shows the measured XRD diffraction patterns for samples 10, 11, 21. All diffraction patterns have peaks at the same locations (within instrument error, that is 0.1°), and match JCPDS crystallography database entry JCPDS 00-049-0289, which corresponds to $VNb_9O_{25}$. There is no amorphous background noise and the peaks are sharp and intense. This means that all samples are phase-pure and crystalline, with crystallite size ~200 nm according to the Scherrer equation and crystal structure matching $VNb_9O_{25}$.

Figures 5, 6:
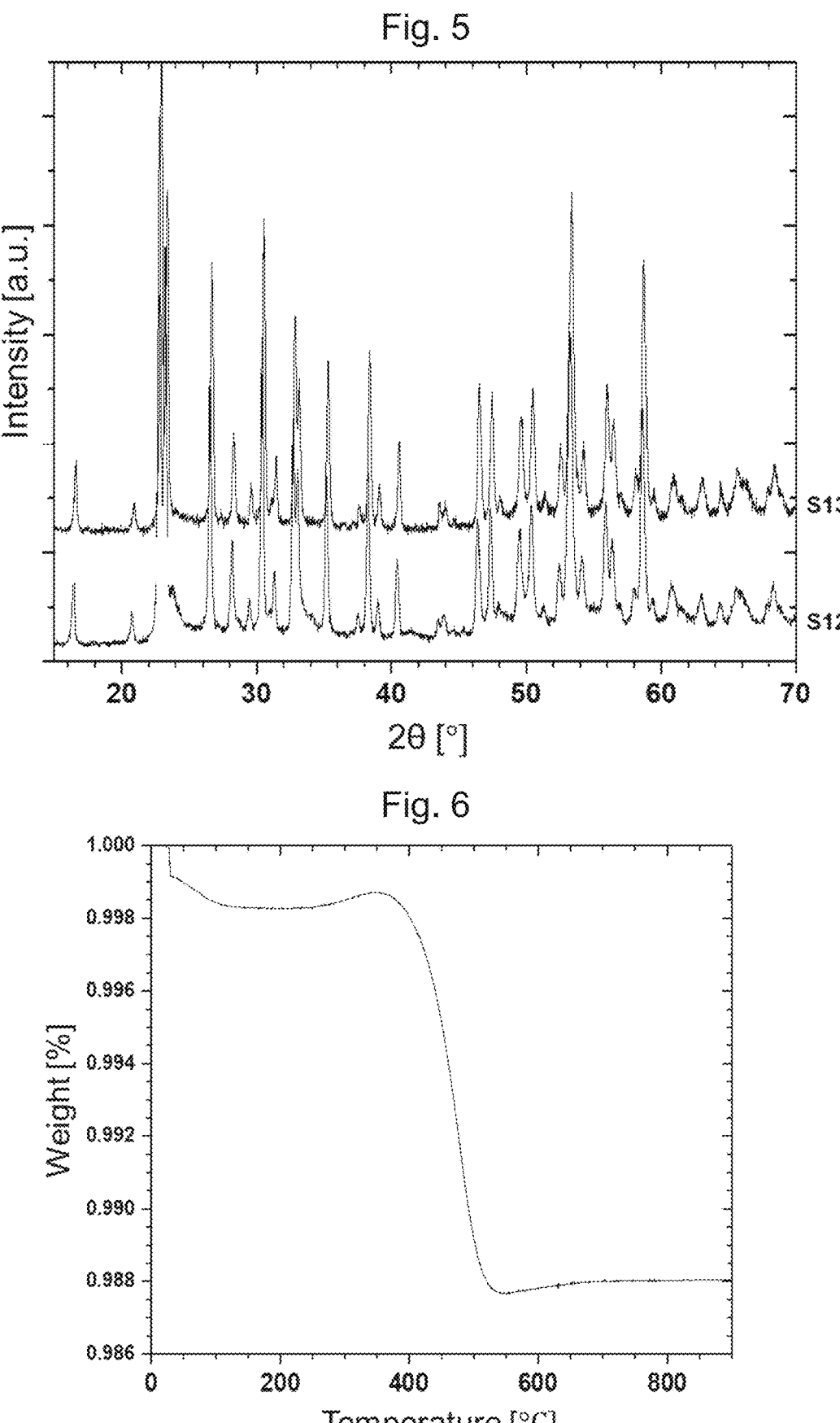
FIG. 5 shows XRD diffraction patterns of samples 12 and 13.
FIG. 6 shows TGA characterisation in air of sample 3.

FIG. 5 shows the measured XRD diffraction patterns for samples 12 and 13. FIG. 29 shows the XRD pattern for sample E14. All diffraction patterns have peaks at the same locations (within instrument error, that is 0.1°), and match JCPDS crystallography database entry JCPDS 00-020-1320, which corresponds to $W_7Nb_4O_{31}$. There is no amorphous background noise and the peaks are sharp and intense. This means that all samples are phase-pure and crystalline, with crystallite size ~200 nm according to the Scherrer equation and crystal structure matching $W_7Nb_4O_{31}$.

Figure 20:
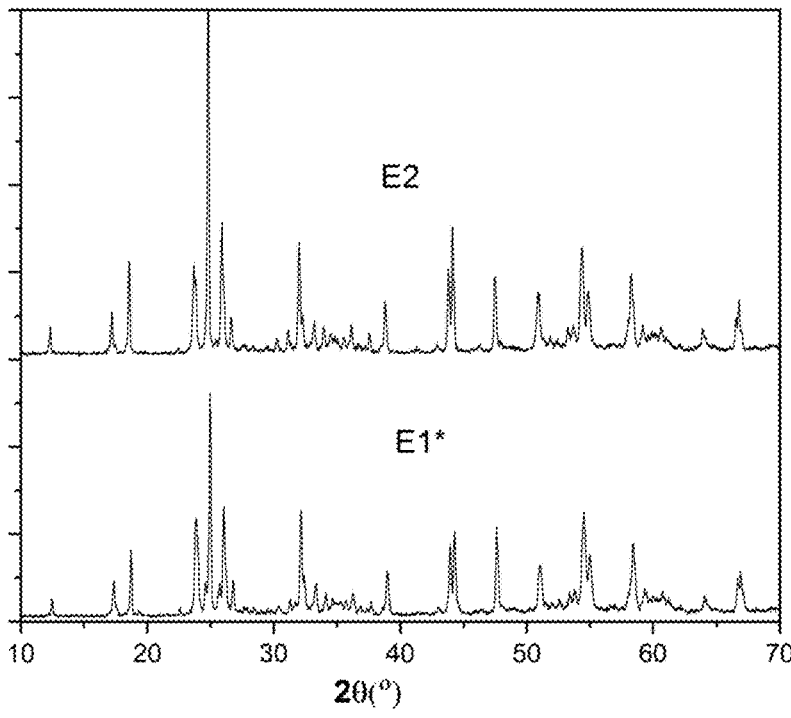
FIG. 20 shows XRD diffraction patterns of samples E1, E2.

FIG. 20 shows the measured XRD diffraction patterns for samples E1, E2. FIG. 29 shows the XRD pattern for sample E13. All diffraction patterns have peaks at the same locations (within)0.1-0.2°, and match JCPDS crystallography database entry JCPDS 22-353. There is no amorphous background noise and the peaks are sharp and intense. This means that all samples are phase-pure and crystalline, with crystallite size 52±12 nm according to the Scherrer equation and crystal structure matching $Zn_2Nb_{34}O_{87}$.

Figure 21:
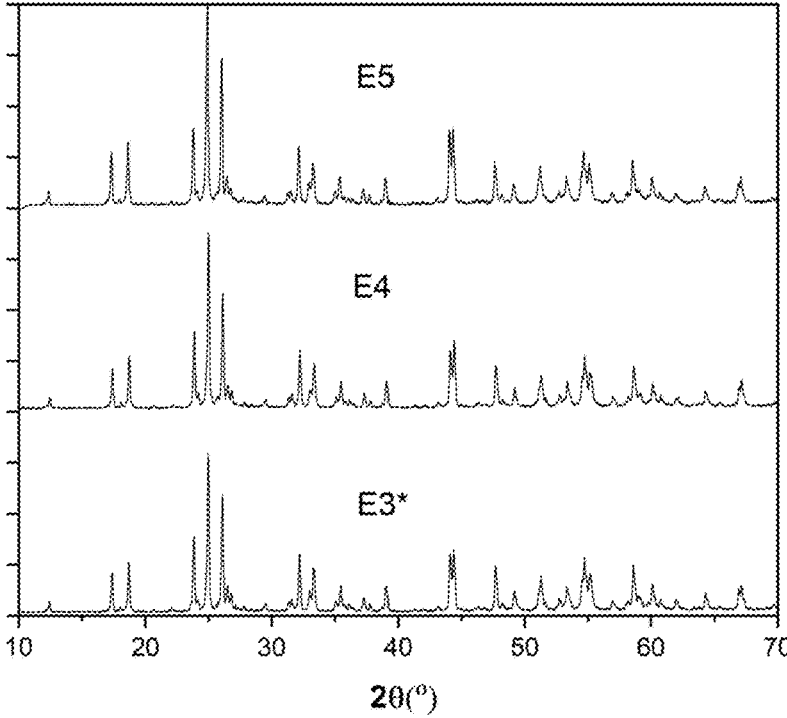
FIG. 21 shows XRD diffraction patterns of samples E3, E4, E5.

FIG. 21 shows the measured XRD diffraction patterns for samples E3, E4, E5. FIG. 29 shows the XRD pattern for sample E12. All diffraction patterns have peaks at the same locations (within)0.1-0.2°, and match JCPDS crystallography database entry JCPDS 72-159 (isostructural $Ti_2Nb_{10}O_{29}$). There is no amorphous background noise and the peaks are sharp and intense. This means that all samples are phase-pure and crystalline, with crystallite size 53±16 nm according to the Scherrer equation and crystal structure matching $AlNb_{11}O_{29}$.

Figure 22:
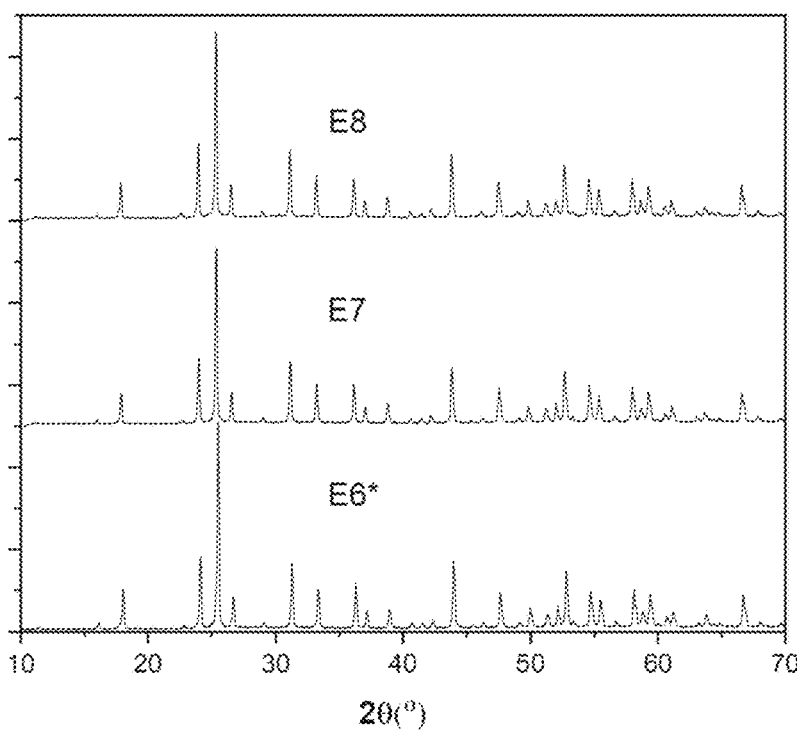
FIG. 22 shows XRD diffraction patterns of samples E6, E7, E8.

FIG. 22 shows the measured XRD diffraction patterns for samples E6, E7, E8. All diffraction patterns have peaks at the same locations (within)0.1-0.2° , and match ICSD crystallography database entry 72683 (isostructural $PNb_9O_{25}$). There is no amorphous background noise and the peaks are sharp and intense. This means that all samples are phase-pure and crystalline, with crystallite size 53±3 nm according to the Scherrer equation and crystal structure matching $GeNb_{18}O_{47}$.

Figure 23:
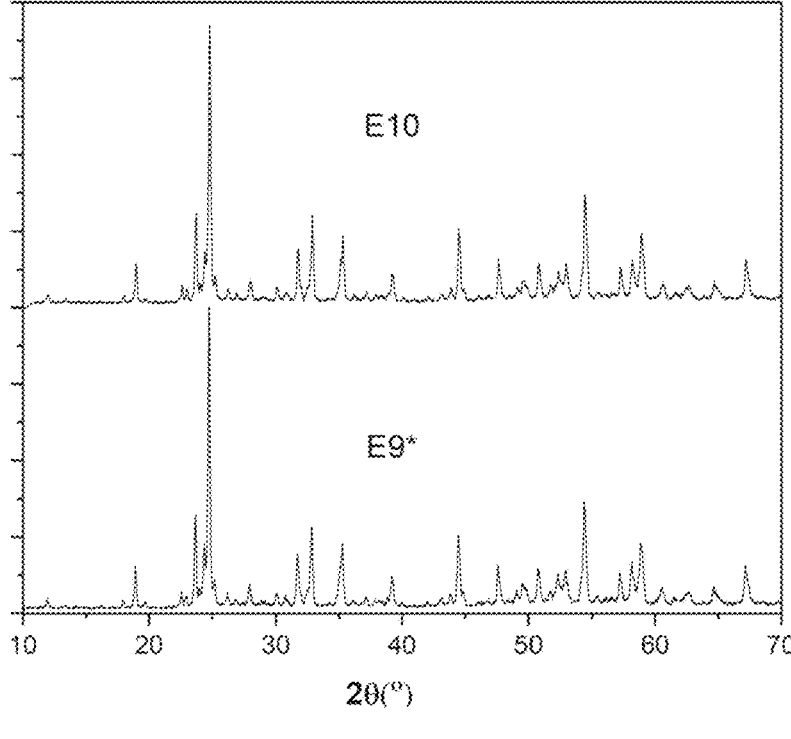
FIG. 23 shows XRD diffraction patterns of samples E9, E10.

FIG. 23 shows the measured XRD diffraction patterns for samples E9, E10. All diffraction patterns have peaks at the same locations (within)0.1-0.2°, and match JCPDS crystallography database entry JCPDS 44-0467. There is no amorphous background noise and the peaks are sharp and intense. This means that all samples are phase-pure and crystalline, with crystallite size 37±11 nm according to the Scherrer equation and crystal structure matching $W5Nbi6O_{55}$.

TGA Characterisation of Samples

Thermogravimetric Analysis (TGA) was performed on some samples using a Perkin Elmer Pyris 1 system in a synthetic air atmosphere. Samples were first held for 15 min at 30° C., then heated from 30° C. to 950° C. at 5° C./min, and finally held for 30 min at 950° C. TGA was performed on sample 3 to quantify carbon content, and on sample 5 to show mass increase as oxygen vacancies are filled.

FIG. 6 shows TGA characterisation in air of sample 3. The sharp drop in mass between ~400° C. and 500° C. is attributed to the decomposition of the carbon coating. The decomposition temperature corresponds to a mixture of amorphous and graphitic carbon. The amount of mass loss indicates that sample 3 includes 1.1 w. % of carbon coating, which is in line with the amount expected from the stoichiometry of the precursors.

Qualitative Assessment of Oxygen Deficiency

As discussed above, sample 5 and 18 were heat-treated at 900° C. for 12 h to form the active electrode material, and was then further annealed in nitrogen (a reducing atmosphere) at 900° C., in a post-processing heat treatment step. A colour change from white to dark purple was observed after the post-processing heat treatment in nitrogen, indicating change in oxidation states and band structure of the material, as a result of oxygen deficiency of the sample.

Samples E8, E10, E11, E12, E13 were further annealed in nitrogen at 1000° C. for 4 h, sample E14 was annealed in nitrogen at 900° C. for 5 h. Sample E7 transitions from a white colour to a deep yellow colour upon introduction of induced oxygen deficiencies in sample E8; sample E9 transitions from an off-white colour to a blue-grey colour upon introduction of induced oxygen deficiencies in sample E10; sample 8 transitions from off-white to light blue in E11; sample E3 transitions from white to grey/black in E12; sample E1 transitions from white to grey/black in E3; sample 12 transitions from light yellow to dark blue in E14.

Particle Size Distribution Analysis of Samples

Particle Size Distributions were obtained with a Horiba laser diffraction particle analyser for dry powder. Air pressure was kept at 0.3 MPa. The results are set out in Table 3, below.

TABLE 3

Summary of particle size distribution statistics for samples 1, 2, 15, 16, 18, 3 before pyrolysis, 3 after pyrolysis, 16 and 18 after post-processing, and samples E1-E14.

| Sample | $D_{10}$ [μm] | $D_{50}$ [μm] | $D_{90}$ [μm] |
|---|---|---|---|
| 1* | 3.8 | 11.2 | 50.0 |
| 2 | 2.6 | 10.9 | 87.4 |
| 15 | 3.6 | 21.2 | 55.3 |
| 16 | 4.7 | 31.2 | 82.9 |
| 18 | 5.1 | 57.7 | 176 |
| 3 before pyrolysis | 4.2 | 8.2 | 16.3 |
| 3 after pyrolysis | 6.7 | 12.7 | 51.1 |

TABLE 3-continued

Summary of particle size distribution statistics for samples
1, 2, 15, 16, 18, 3 before pyrolysis, 3 after pyrolysis,
16 and 18 after post-processing, and samples E1-E14.

| Sample | $D_{10}$ [µm] | $D_{50}$ [µm] | $D_{90}$ [µm] |
|---|---|---|---|
| 16 after impaction milling | 1.0 | 2.6 | 4.8 |
| 18 after impaction milling | 1.4 | 4.4 | 9.6 |
| E1* | 3.7 | 5.9 | 9.3 |
| E2 | 5.1 | 9.2 | 16.5 |
| E3* | 3.6 | 6.6 | 12.0 |
| E4 | 4.3 | 7.7 | 13.9 |
| E5 | 3.7 | 7.0 | 15.5 |
| E6* | 4.3 | 8.1 | 16.5 |
| E7 | 4.3 | 9.7 | 20.4 |
| E8 | 5.3 | 10.8 | 21.3 |
| E9* | 3.1 | 5.5 | 9.3 |
| E10 | 2.7 | 5.1 | 9.3 |
| E11 | 3.3 | 5.5 | 8.7 |
| E12 | 4.2 | 7.8 | 18.4 |
| E13 | 4.2 | 6.8 | 10.8 |
| E14 | 1.2 | 4.5 | 10.1 |

Figure 7:
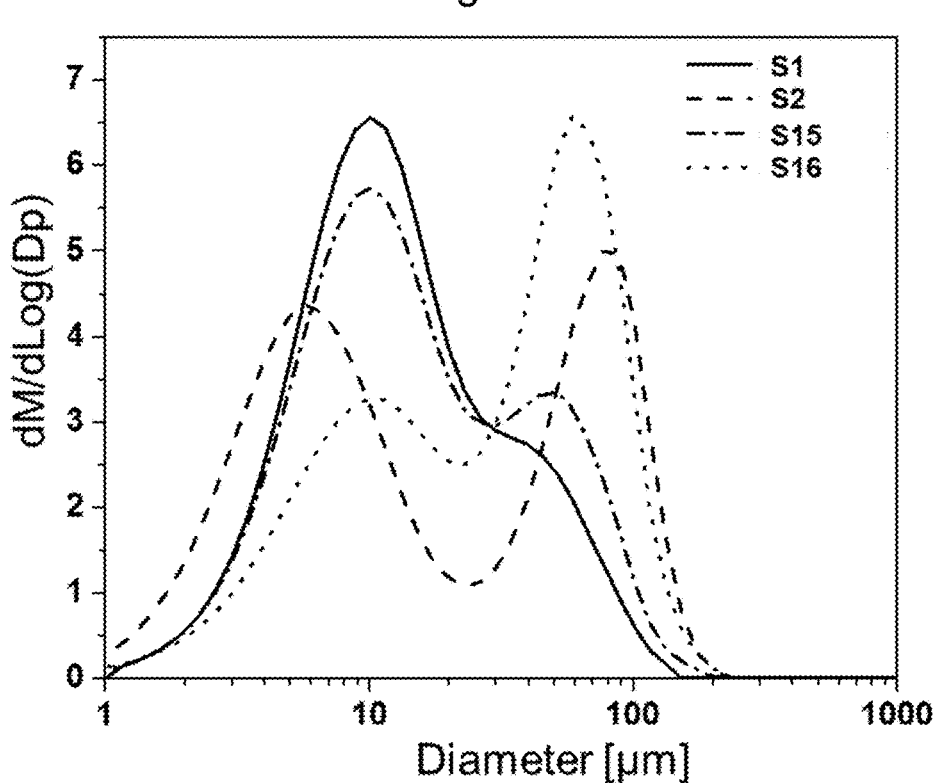
FIG. 7 shows the particle size distribution of samples 1, 2, 15, and 16.
Figure 8:
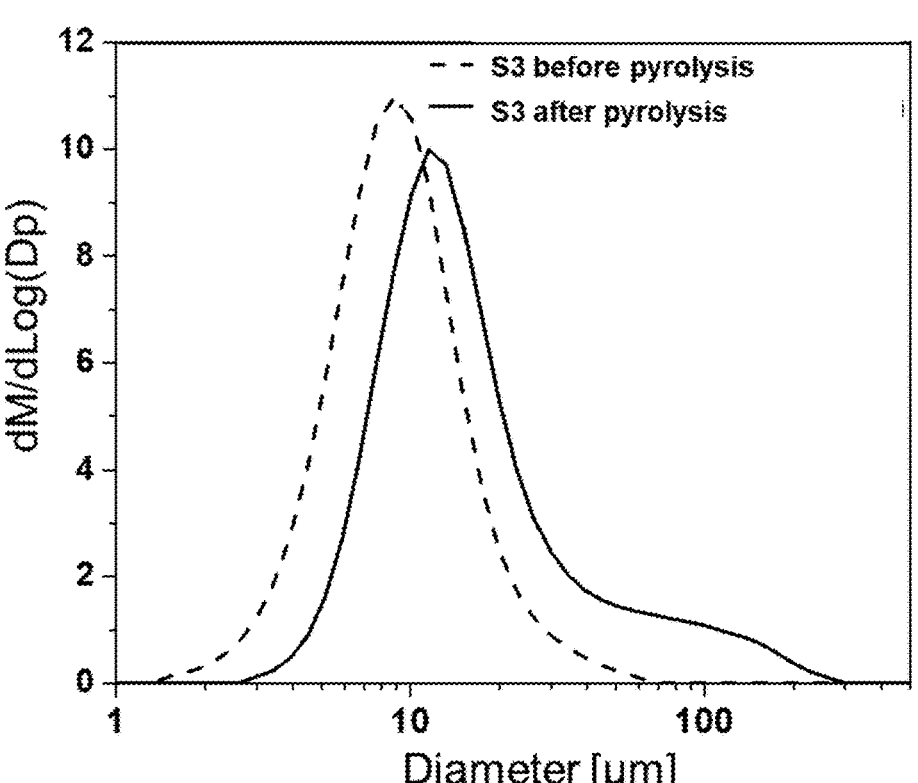
FIG. 8 shows the particle size distribution of sample 3.

FIG. 7 shows particle size distributions (measured particle size being secondary particle size, not crystal or crystallite size) for samples 1, 2, 15, and 16, as a representative example of particle size distributions obtained by solid state routes in this study without further processing or size optimisation. The particle size distributions are typically bi-modal, with a first mode ~10 µm, and a second mode ~90 µm. Sample 3 presents significant differences in terms of particle size distribution, as shown in FIG. 8 due to the spray-drying and pyrolysis post-processing step.

Figure 17:
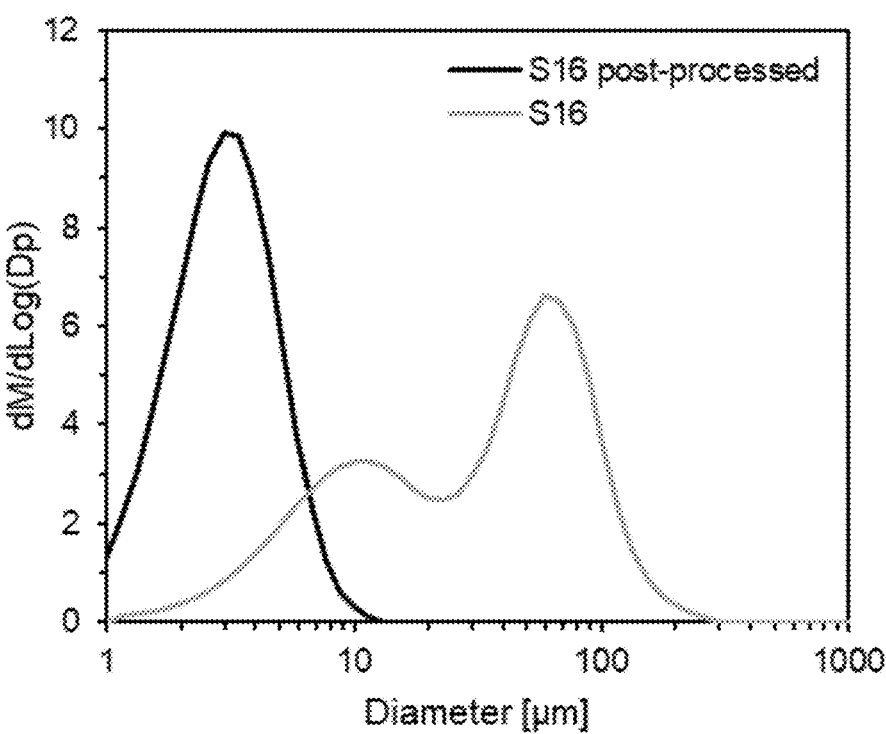
FIG. 17 shows the particle size distributions of sample 16 before and after post-processing.

All particle size distributions can also be refined with further processing steps, for example spray drying, ball milling, high shear milling, jet milling or impact milling to reduce the particle size distribution to the desired range (e.g. d90 <20 µm, <10 µm or <5 µm) as shown in FIG. 17 and Table 3. Typically the particle size distributions are tuned by optimising the phase formation process (i.e. solid state synthesis route) and post-processing steps for the target application. For example, for a Li ion electrode with high power, one would typically target lower average particle sizes, amongst other considerations.

Figure 24:
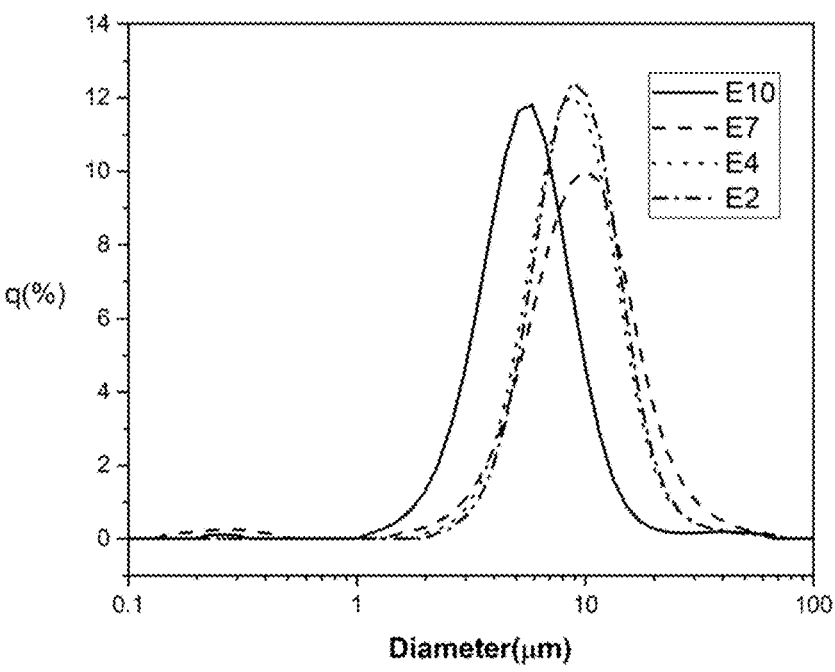
FIG. 24 shows the particle size distributions of samples E2, E4, E7, E10.

FIG. 24 shows the particle size distributions for samples E2, E4, E7, E10 in their final form, which are then processed into electrode slurries and inks.

SEM Characterisation of Samples

The morphology of some samples was analysed by Scanning Electron Microscopy (SEM).

Figure 9:
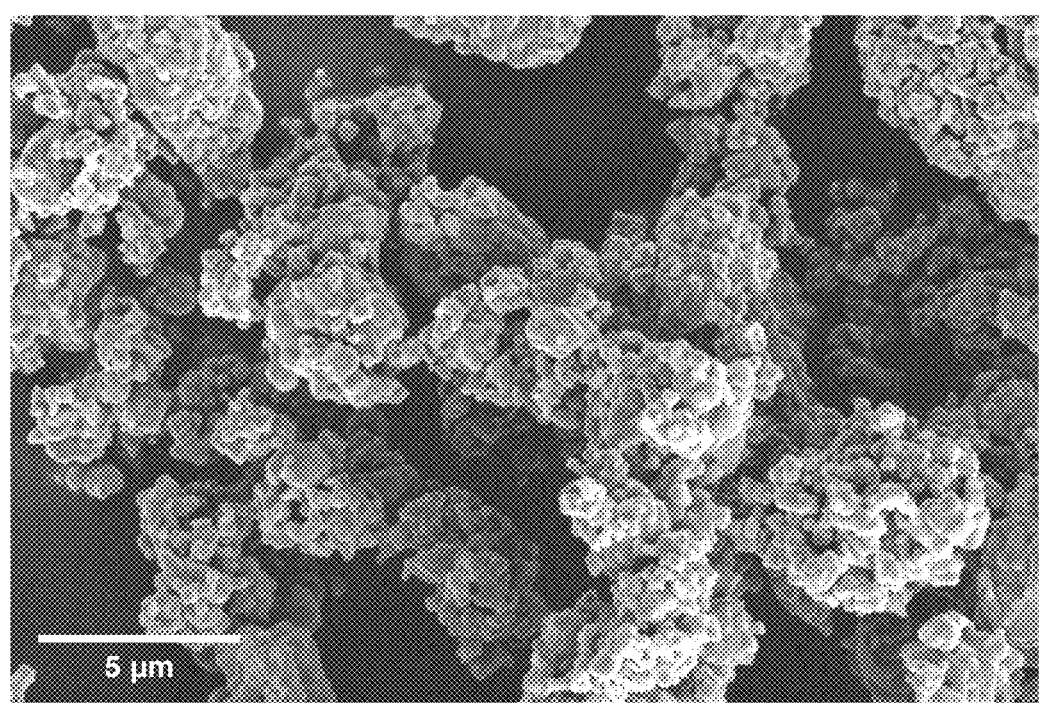
FIG. 9 is an SEM image of sample 3 before pyrolysis and coated with conductive Au for imaging.
Figure 10:
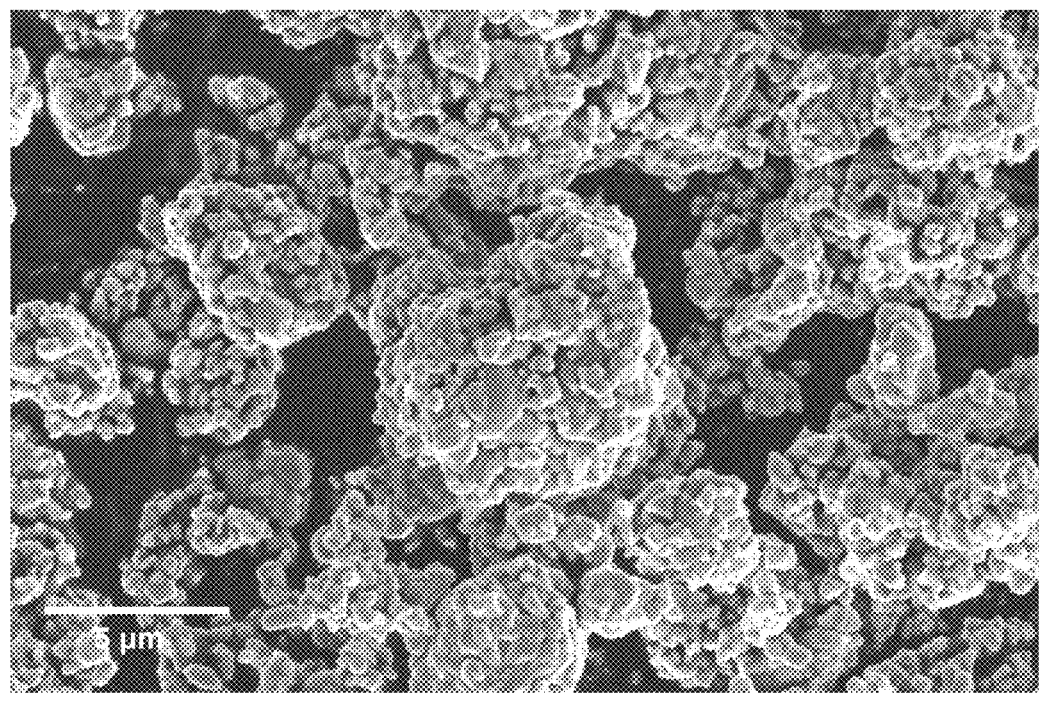
FIG. 10 is an SEM image of sample 3 after pyrolysis (no conductive coating)
Figure 18:
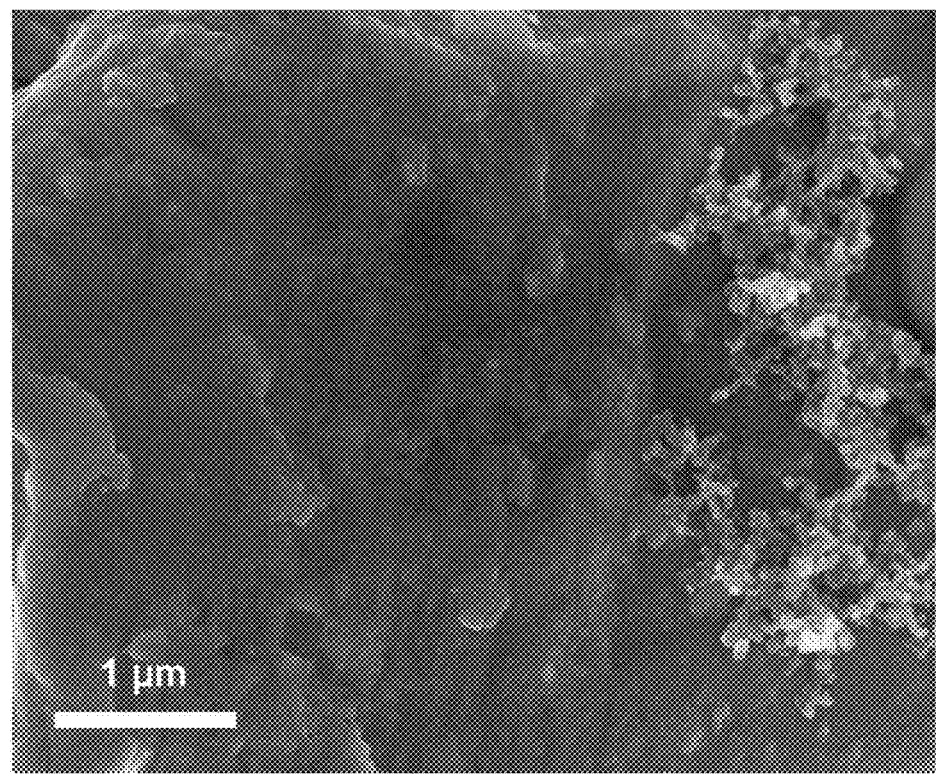
FIG. 18 is an SEM image of the surface of an electrode made from sample 22, focused on the surface of an active material particle.

FIGS. 9 and 10 show SEM images of sample 3 before and after pyrolysis. A porous microsphere morphology with carbon coating is observed, with primary crystallites organised into secondary particles. It can be seen that the material has with homogeneous porous particles that can pack efficiently to form a high-density electrode. Qualitatively the conductivity is vastly improved as a conductive coating does not need to be applied for SEM imaging to be carried out, implying an order of magnitude improvement in material surface conductivity. FIG. 18 is an SEM image of the surface of a particle in an electrode of sample 22, where conductive carbon black particles contained in the electrode can also be seen in the right side of the image. This visibly shows evidence of a conformal carbon coating around the MNO material.

Figure 11:
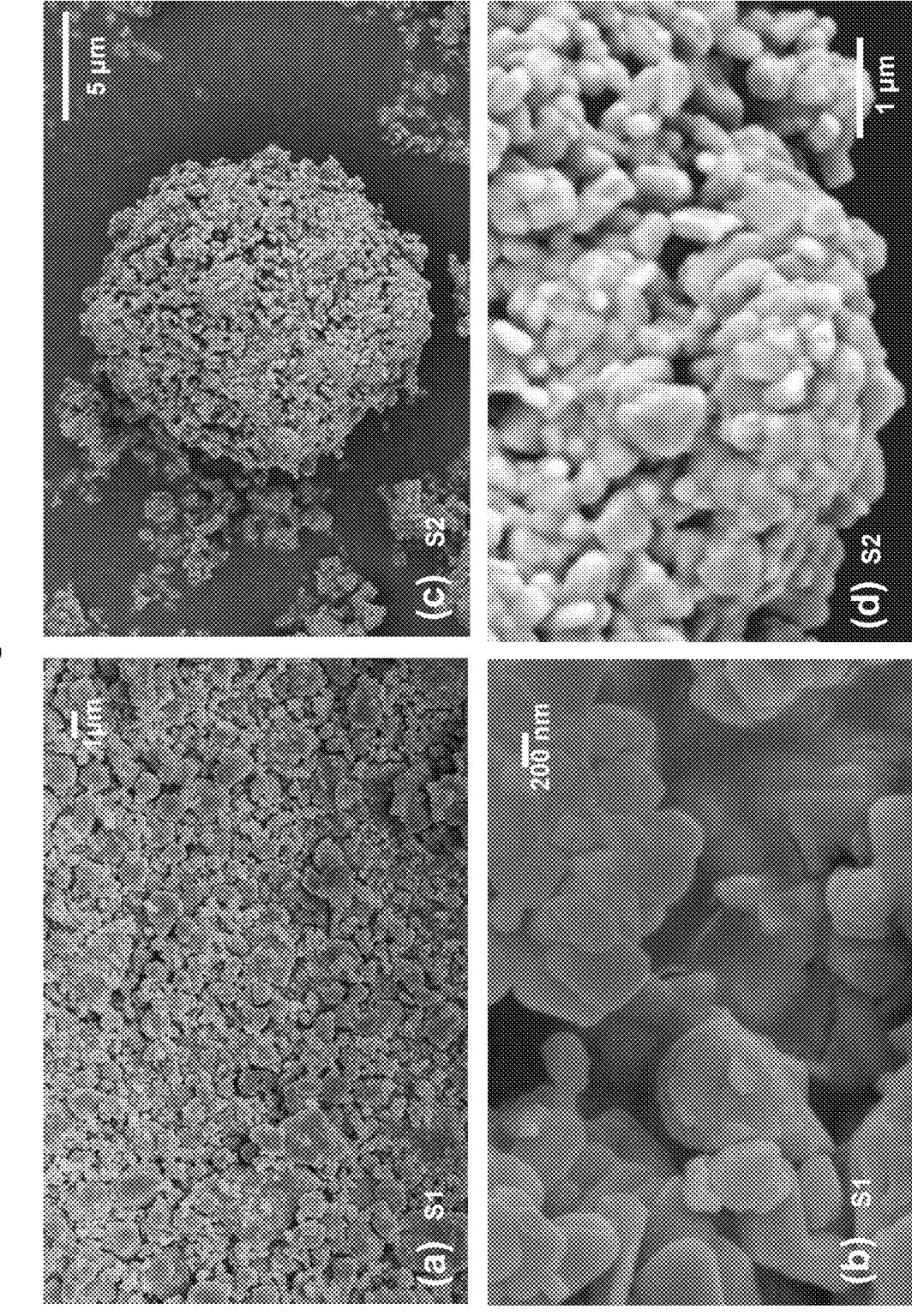
FIGS. 11 are SEM images of samples 1 and 2.

FIG. 11 shows SEM images of samples 1 and 2, and corroborates XRD and PSD data, showing compact secondary particle micron-size particles composed of ~200 nm primary crystallites.

Electrochemical Testing of Samples

Electrochemical tests were carried out in half-coin cells (CR2032 size) for initial analysis. In half-coin tests, the material is tested in an electrode versus a Li metal electrode to assess its fundamental performance. In the below examples, the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer (although it is also possible to form aqueous slurries by using water rather than NMP). The non-NMP composition of the slurries was 80 w. % active material, 10 w. % conductive additive, 10 w. % binder. The slurry was then coated on an Al foil current collector to the desired loading of 1 mg/cm² by doctor blade coating and dried in a vacuum oven for 12 hours. Electrodes were punched out at the desired size and combined with a separator (Celgard porous PP/PE), Li metal, and electrolyte (1 M LiPF₆ in EC/DEC) inside a steel coin cell casing and sealed under pressure. Formation cycling was then carried out at low current rates (C/20) for 2 full charge and discharge cycles. After formation, further cycling can be carried out at a fixed or varied current density as required. These tests have been termed "half-cell galvanostatic cycling" for future reference. For samples E1-E10, the electrolyte was altered to 1.3 M LiPF6 in 3:7 EC/DEC, and the formation cycling was carried out at C/10 for 2 charge/discharge cycles in the limits 1.1-3.0 V. The values shown for these samples is an average of 3 measurements, with the error being the standard deviation.

Homogeneous, smooth coatings on current collector foil, the coatings being free of visible defects were also prepared as above with a centrifugal planetary mixer to a composition of 94 w. % active material, 4 w. % conductive additive, 2 w. % binder. The coatings were calendared at 80° C. to a density of up to 3.0 g/cm³ at loadings of 1.3-1.7 mAh/cm² in order to demonstrate possible volumetric capacities >700 mAh/cm³ in the voltage range 0.7-3.0 V at C/20, and >640 mAh/cm³ in the voltage range 1.1-3.0 V at C/5. This is an important demonstration of these materials being viable in a commercially focussed electrode power cell formulation, where retaining performance after calendaring to a high electrode density allows for high volumetric capacities. Loadings of up to and including 1.0, 1.5, 2.0, 2.5, or 3.0 mAh/cm² may be useful for Li-ion cells focussed on power performance; loadings greater than 3.0, 4.0, or 5.0 mAh/cm² are useful for energy-focussed performance in Li ion cells. Calendaring of these materials was demonstrated down to electrode porosity values of 35%, and typically in the range 35-40%; defined as measured electrode density divided by the average of the true densities of each electrode component adjusted to their w/w%.

Electrical conductivity of electrodes made with the samples listed in Table 1 was measured using a 4-point probe thin film resistance measurement apparatus. Slurries were formulated according to the procedure described above and coated on a dielectric mylar film at a loading of 1 mg/cm². Electrode-sized discs where then punched out and resistance of the coated-film was measured using a 4-point probe. Bulk resistivity can be calculated from measured resistance using the following equation:

$$\text{Bulk resistivity } (\rho) = 2\pi s(V/I); \ R = V/I;$$
$$s = 0.1 \text{ cm} = 2\lambda \times 0.1 \times R \ (\Omega) \quad (3)$$

The results of this test are shown in Table 4, below:

TABLE 4

Summary of 4-point probe resistivity measurement results for samples 1, 2, 4, 5, 6, 7, 13 to 20, and 22.

| Sample | Resistance [kΩ] | Bulk resistivity [kΩ · cm] |
|---|---|---|
| 1* | 8.5 | 5.3 |
| 2 | 1.7 | 1.1 |
| 4 | 3.2 | 2.0 |
| 5 | 0.52 | 0.33 |
| 6* | 0.37 | 0.23 |
| 7 | 0.52 | 0.33 |
| 13 | 0.45 | 0.28 |
| 14 | 2.7 | 1.7 |
| 15 | 1.2 | 0.75 |
| 16 | 1.3 | 0.82 |
| 17 | 0.34 | 0.21 |
| 18 | 0.89 | 0.56 |
| 19 | 0.18 | 0.11 |
| 20 | 0.20 | 0.13 |
| 22 | 0.33 | 0.21 |

Samples E1-E14 also had their 4-point probe resistance measured to quantify their electrical resistivity. This was carried out with a different Ossila instrument (T2001A3-UK) at 23° C. for coatings on mylar films at loadings of 1.0 mg/cm$^2$. The results for sheet resistance (Ω/square) are outlined in Table 4a, with error based on the standard deviation of 3 measurements.

TABLE 4a

Summary of 4-point probe resistivity measurement results for samples E1 to E14.

| Sample | Sheet Resistivity [Ω/square] |
|---|---|
| E1* | 1242 ± 156 |
| E2 | 1041 ± 103 |
| E3* | 1396 ± 74 |
| E4 | 1215 ± 52 |
| E5 | 1057 ± 35 |
| E6* | 1092 ± 52 |
| E7 | 1009 ± 89 |
| E8 | 965 ± 83 |
| E9* | 1135 ± 92 |
| E10 | 1113 ± 99 |
| E12 | 891 ± 61 |
| E13 | 1027 ± 13 |
| 12* | 853 ± 51 |
| E14 | 846 ± 57 |
| 6* | 880 ± 29 |

The direct current internal resistance (DCIR) and the resultant area specific impedance (ASI) is a key measurement of internal resistance in the electrode in a Li-ion cell. In a typical measurement, a cell that has already undergone formation will be cycled at C/2 for 3 cycles. With the electrode in its delithiated state a C/2 discharge current is applied for 1 h to achieve ~50% lithiation. The cell is rested for 30 mins to equilibrate at its OCV (open circuit voltage), and then a 5C current pulse is applied for 10 s, followed by a 30 mins rest to reach the OCV. During the 10 s pulse the voltage response is sampled at a higher frequency to determine the average internal resistance accurately. The resistance is then calculated from V=IR, using the difference between the OCV (the linear average between the initial OCV before the pulse and afterwards) and the measured voltage. The resistance is then multiplied by the area of the electrode to result in the ASI.

The results of this test are shown in Table 5, below:

TABLE 5

Summary of DCIR/ASI measurement results for samples 1, 2, 4, 7, 14, 16, and 17.

| Sample | ASI/Ω · cm$^2$ |
|---|---|
| 1* | 141 |
| 2 | 125 |
| 4 | 120 |
| 6* | 126 |
| 7 | 162 |
| 13 | 67 |
| 14 | 99 |
| 16 | 74 |
| 17 | 162 |
| 18 | 75 |
| 19 | 164 |
| 22 | 121 |

The reversible specific capacity C/20, initial coulombic efficiency, nominal lithiation voltage vs Li/Li+ at C/20, 5C/0.5C capacity retention, and 100/0.50 capacity retention for a number of samples were also tested, the results being set out in Table 6, below. Nominal lithiation voltage vs Li/Li+ has been calculated from the integral of the V/Q curve divided by the total capacity on the 2$^{nd}$ cycle 0/20 lithiation. Capacity retention at 10C and 5C has been calculated by taking the specific capacity at 10C or 5C, and dividing it by the specific capacity at 0.5C. It should be noted that the capacity retention was tested with symmetric cycling tests, with equivalent C-rate on lithiation and delithiation. Upon testing with an asymmetric cycling program, 100/0.50 capacity retention greater than 89% is routinely observed.

Samples E1-E10 were tested with minor differences in Table 6a, the reversible specific capacity shown is the 2$^{nd}$ cycle delithiation capacity at C/10, the nominal lithiation voltage vs Li/Li+ is at C/10 in the 2$^{nd}$ cycle, the rate tests were carried out with an asymmetric cycling program with no constant voltage steps (i.e. constant current), with lithiation at C/5 and delithiation at increasing C-rates.

TABLE 6

Summary of electrochemical testing results from Li-ion half coin cells using a number of samples. In general (although not exclusively) it is beneficial to have a higher capacity, a higher ICE, a lower nominal voltage, and higher capacity retentions.

| Sample | Reversible specific capacity C/20 [mAh/g] | Initial coulombic efficiency [%] | Nominal lithiation voltage vs Li/Li$^+$ [V] | 5 C/0.5 C capacity retention [%] | 10 C/0.5 C capacity retention [%] |
|---|---|---|---|---|---|
| 1* | 214 | 87.8 | 1.61 | 62 | 35 |
| 2 | 240 | 90.9 | 1.61 | 64 | 45 |
| 3 | 203 | 84.9 | 1.58 | 79 | 68 |
| 4 | 286 | 90.7 | 1.59 | 68 | 54 |
| 5 | 253 | 86.0 | 1.60 | 63 | 43 |
| 6* | 224 | 93.5 | 1.57 | 61 | 38 |
| 7 | 263 | 93.6 | 1.58 | 74 | 67 |
| 8* | 192 | 82.0 | 1.60 | 54 | 36 |
| 9 | 188 | 86.8 | 1.61 | 64 | 54 |
| 10* | 172 | 74.3 | 1.55 | 64 | 54 |
| 11 | 176 | 71.6 | 1.59 | 56 | 45 |
| 12* | 164 | 93.9 | 1.77 | 86 | 81 |
| 13 | 184 | 95.4 | 1.75 | 86 | 80 |
| 14 | 278 | 91.0 | 1.59 | | |
| 15 | 228 | 89.2 | 1.59 | | |
| 16 | 281 | 90.8 | 1.58 | 72 | 58 |
| 17 | 203 | 94.6 | 1.58 | | |

TABLE 6-continued

Summary of electrochemical testing results from Li-ion half coin cells using a number of samples. In general (although not exclusively) it is beneficial to have a higher capacity, a higher ICE, a lower nominal voltage, and higher capacity retentions.

| Sample | Reversible specific capacity C/20 [mAh/g] | Initial coulombic efficiency [%] | Nominal lithiation voltage vs Li/Li+ [V] | 5 C/0.5 C capacity retention [%] | 10 C/0.5 C capacity retention [%] |
|---|---|---|---|---|---|
| 18 | 228 | 90.1 | 1.59 | 84 | 68 |
| 19 | 193 | 87.0 | 1.56 | 63 | 44 |
| 21 | 169 | 70.9 | 1.59 | 67 | 56 |
| 22 | 267 | 86.9 | 1.57 | 71 | 62 |

TABLE 6a

Summary of electrochemical testing results from Li-ion half coin cells using a number of samples.

| Sample | Specific capacity C/10 [mAh/g] | Initial coulombic efficiency [%] | Nominal lithiation voltage C/10 [V] | ASI [Ω · cm²] | 5 C/0.5 C capacity retention [%] | 10 C/0.5 C capacity retention [%] |
|---|---|---|---|---|---|---|
| E1* | 222 ± 7 | 98.23 ± 0.51 | 1.543 ± 0.001 | 169 ± 10 | 96.5 ± 0.1 | 95.9 ± 0.1 |
| E2 | 273 ± 17 | 98.52 ± 0.45 | 1.550 ± 0.001 | 106 ± 18 | 97.3 ± 0.4 | 96.2 ± 0.7 |
| E3* | 244 ± 26 | 96.75 ± 0.31 | 1.549 ± 0.002 | 166 ± 17 | 96.1 ± 0.6 | 95.2 ± 0.8 |
| E4 | 252 ± 9 | 98.80 ± 0.86 | 1.549 ± 0.001 | 109 ± 9 | 98.4 ± 0.0 | 97.4 ± 0.1 |
| E5 | 272 ± 21 | 99.69 ± 1.56 | 1.549 ± 0.001 | 122 ± 3 | 96.3 ± 0.3 | 94.8 ± 0.4 |
| E6* | 134 ± 14 | 80.97 ± 1.55 | 1.539 ± 0.007 | 485 ± 75 | 72.8 ± 5.7 | 64.1 ± 7.2 |
| E7 | 150 ± 8 | 82.15 ± 0.12 | 1.531 ± 0.000 | 390 ± 32 | 67.0 ± 0.4 | 56.8 ± 0.5 |
| E8 | 144 ± 2 | 81.64 ± 1.35 | 1.530 ± 0.001 | 400 ± 42 | 72.9 ± 1.2 | 63.3 ± 1.5 |
| E9* | 211 ± 5 | 94.53 ± 0.18 | 1.630 ± 0.001 | 129 ± 13 | 96.2 ± 0.4 | 95.1 ± 0.5 |
| E10 | 201 ± 7 | 98.42 ± 1.12 | 1.626 ± 0.000 | 118 ± 16 | 96.2 ± 0.1 | 94.9 ± 0.2 |
| E12 | 198 ± 13 | 97.71 ± 0.25 | 1.544 ± 0.001 | 208 ± 8 | 95.2 ± 0.8 | 92.9 ± 1.0 |
| E13 | 203 ± 15 | 98.22 ± 0.12 | 1.546 ± 0.001 | 199 ± 10 | 97.7 ± 0.0 | 97.7 ± 0.5 |

The modification of mixed niobium oxide-based Wadsley-Roth and Bronze structures as outlined in the claims demonstrate the applicability of the present invention to improve active material performance in Li-ion cells. By substituting the non-Nb cation to form a mixed cation structure as described, the entropy (cf disorder) can increase in the crystal structure, reducing potential energy barriers to Li ion diffusion through minor defect introduction (e.g. samples E7, 16). Modification by creating mixed cation structures that retain the same overall oxidation state demonstrate the potential improvements by altering ionic radii, for example replacement of an $Mo^{6+}$ cation with $W^{6+}$ in sample 14 or $Fe^{3+}$ or $Ga^{3+}$ for $Al^{3+}$ in samples E4 and E5, which can cause minor changes in crystal parameters and Li-ion cavities (e.g. tuning the reversibility of Type VI cavities in Wadsley-Roth structures) that can improve specific capacity, Li-ion diffusion, and increase Coulombic efficiencies of cycling by reducing Li ion trapping. Modification by creating mixed cation structures that result in increased oxidation state (e.g. $Ge^{4+}$ to replace $Zn^{2+}$ in sample E2, or $Mo^{6+}$ for $Zr^{4+}$ in sample 19) demonstrate similar potential advantages with altered ionic radii relating to capacity and efficiency, compounded by introduction of additional electron holes in the structure to aid in electrical conductivity. Modification by creating mixed cation structures that result in decreased oxidation state (e.g. K+ and $Co^{3+}$ to replace $Ge^{4+}$ in sample E7, or $Ti^{4+}$ to replace $Mo^{6+}$ in sample 2) demonstrate similar potential advantages with altered ionic radii relating to capacity and efficiency, compounded by introduction of oxygen vacancies and additional electrons in the structure to aid in electrical conductivity. Modification by inducing oxygen deficiency from high temperature treatment in inert or reducing conditions demonstrate the loss of a small proportion of oxygen from the structure, providing a reduced structure of much improved electrical conductivity (e.g. sample 5, E10 and E12-14) and improved electrochemical properties such as capacity retention at high C-rates (e.g. sample 5, E13). Combination of mixed cation structures and induced oxygen deficiency allows multiple beneficial effects (e.g. increased specific capacity, reduced electrical resistance) to be compounded (e.g. samples 18, E8).

Figure 12:
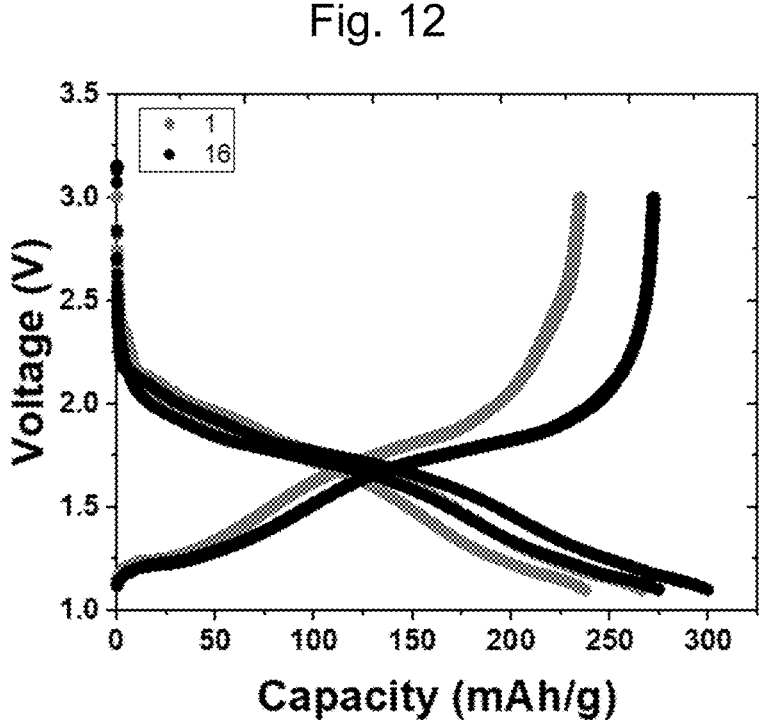
FIG. 12 shows representative lithiation and delithiation voltage profiles obtained by galvanostatic cycling in half cell configuration, 1.1-3.0 V voltage window, first 2 cycles at 0.05C rate for samples 1 and 16.
Figure 13:
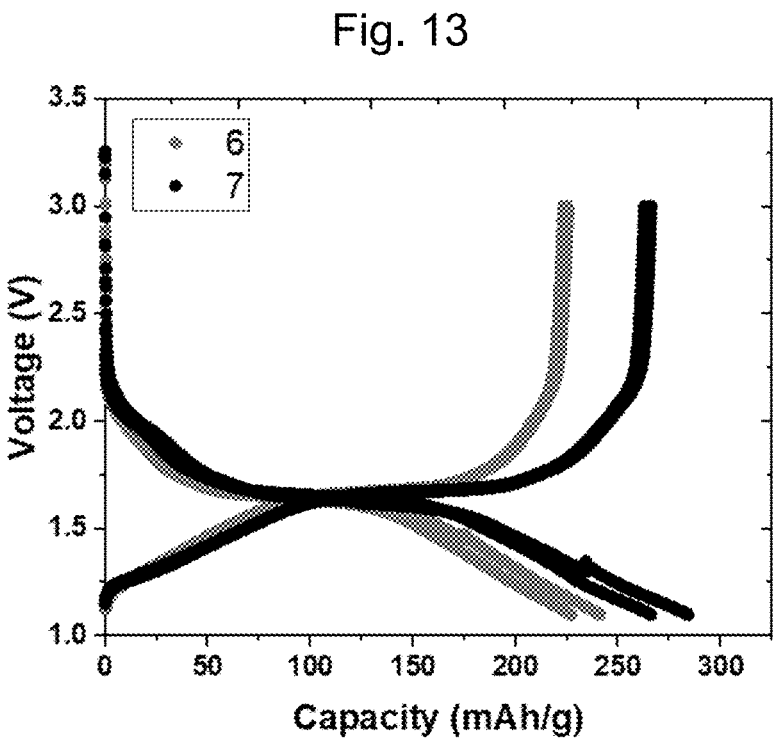
FIG. 13 shows representative lithiation and delithiation voltage profiles obtained by galvanostatic cycling in half cell configuration, 1.1-3.0 V voltage window, first 2 cycles at 0.05C rate for samples 6 and 7.
Figure 19:
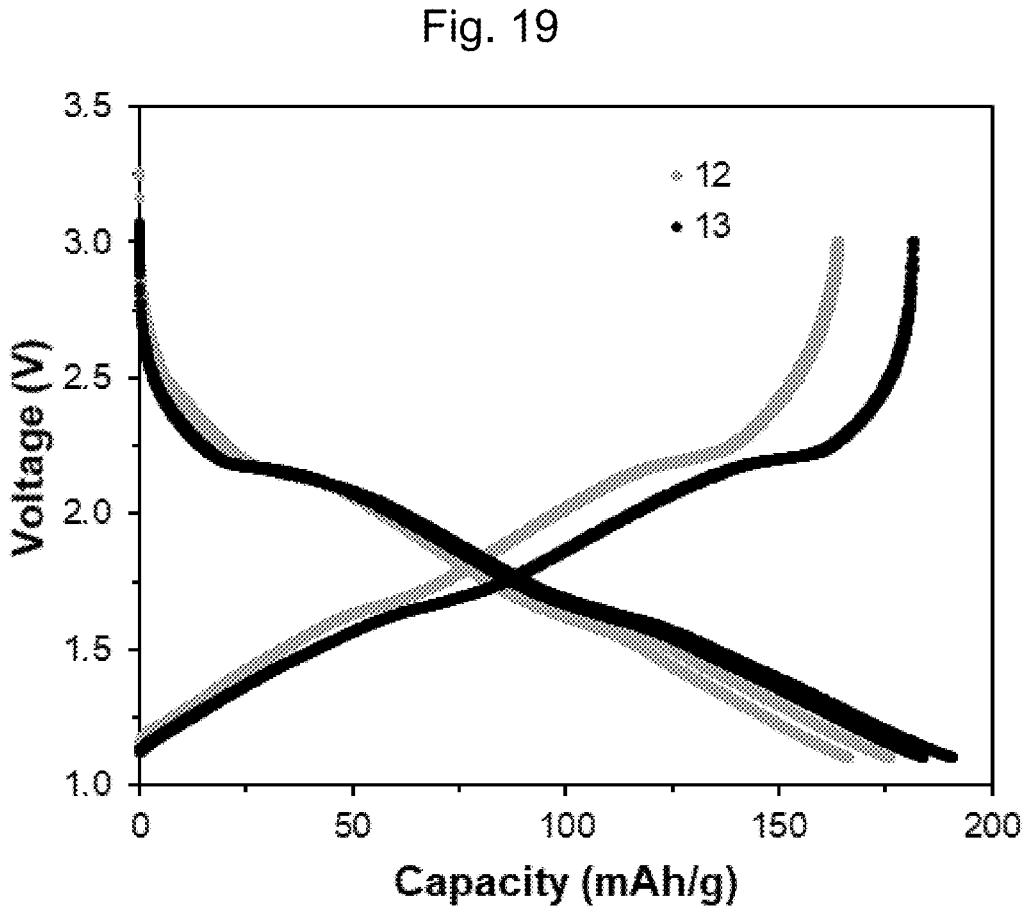
FIG. 19 shows representative lithiation and delithiation voltage profiles obtained by galvanostatic cycling in half cell configuration, 1.1-3.0 V voltage window, first 2 cycles at 0.05C rate for samples 12 and 13.

FIGS. 12, 13, and 19 show representative lithiation/delithiation curves for unmodified and modified $MoNb_{12}O_{33}$ (FIG. 12—samples 1 and 6) $ZrNb_{24}O_{62}$ (FIG. 13—samples 6 and 7), and $W_7Nb_4O_{31}$ (FIG. 19—samples 12 and 13) in their first two formation cycles at C/20 rate. In FIG. 12, approximately 90% of the specific capacity for sample 16 demonstrated is shown to be in a narrow voltage range of ca. 1.2—2.0 V, and in FIG. 13 approximately 90% of the capacity for sample 7 demonstrated is shown to be in a narrow range of ca. 1.25-1.75 V; these data highlight the attractive voltage profiles achievable with MNO crystals based upon Wadsley-Roth crystal structures. In FIG. 19, approximately 90% of the specific capacity for sample 13 is shown to be in a narrow range of ca. 1.2-2.2 V; this demonstrates that attractive voltage profiles are achieved with MNO crystals based upon a tetragonal bronze crystal structure. Secondly, the complex metal oxide samples 7, 16, and 13 demonstrate improved specific capacity as compared to their unmodified crystals samples 1, 6 and 12. This is due to the cations that are included in the complex structures increasing the number of sites in the crystal that Li ions can accommodate due to their differing ionic radii and oxidation states, thus increasing capacity. An increase in ICE was observed between samples 1 and 16, and samples 12 and 13, which further demonstrates that Li ions intercalated in the modified crystal structure can be more efficiently delithiated as the Li ion sites are modified to enable their de-intercalation.

FIG. 24 demonstrates the particle size distribution of samples E2, E4, E8, E11 containing primarily a single peak that has a narrow distribution, i.e. $D_{10}$ and $D_{90}$ are similar in value to $D_{50}$. This is advantageous for processing the material in electrode slurries for efficient packing of the material, and to maintain a homogeneous electrochemical performance (e.g. a smaller particle will be fully lithiated in advance of a larger particle due to shorter diffusion distances).

Figure 25:
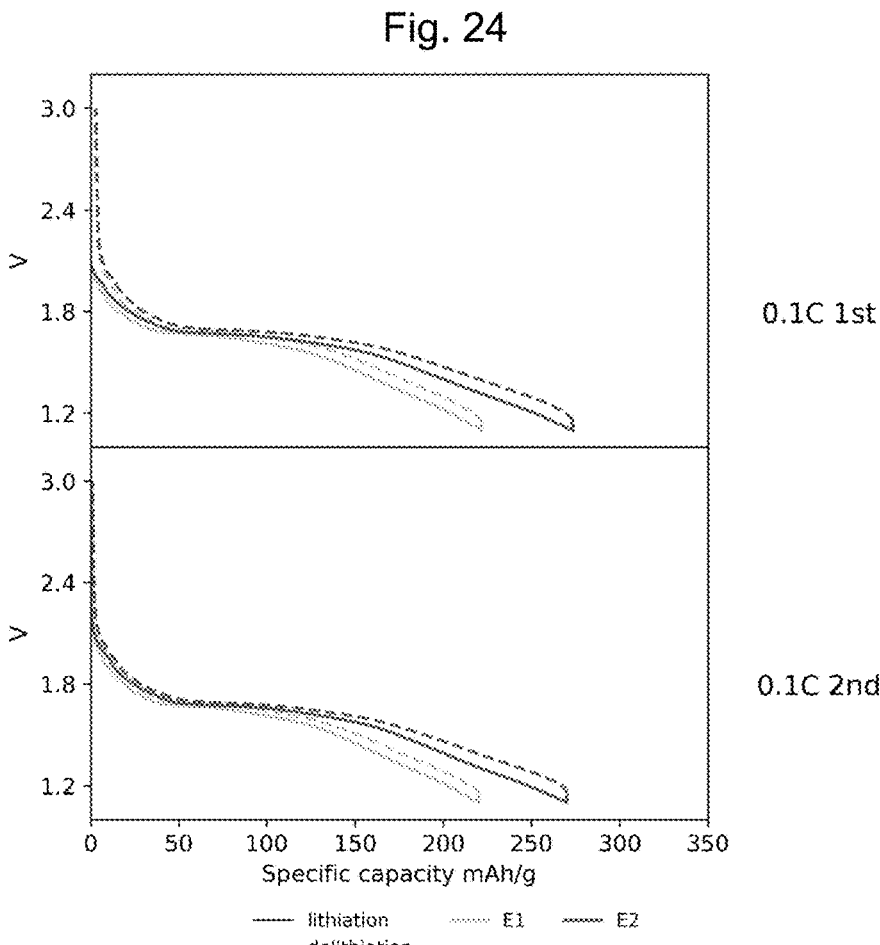
FIG. 25 shows representative lithiation and delithiation voltage profiles obtained by galvanostatic cycling in half cell configuration, 1.1-3.0 V voltage window, first 2 cycles at 0.1C rate for samples E1 and E2.
Figure 26:
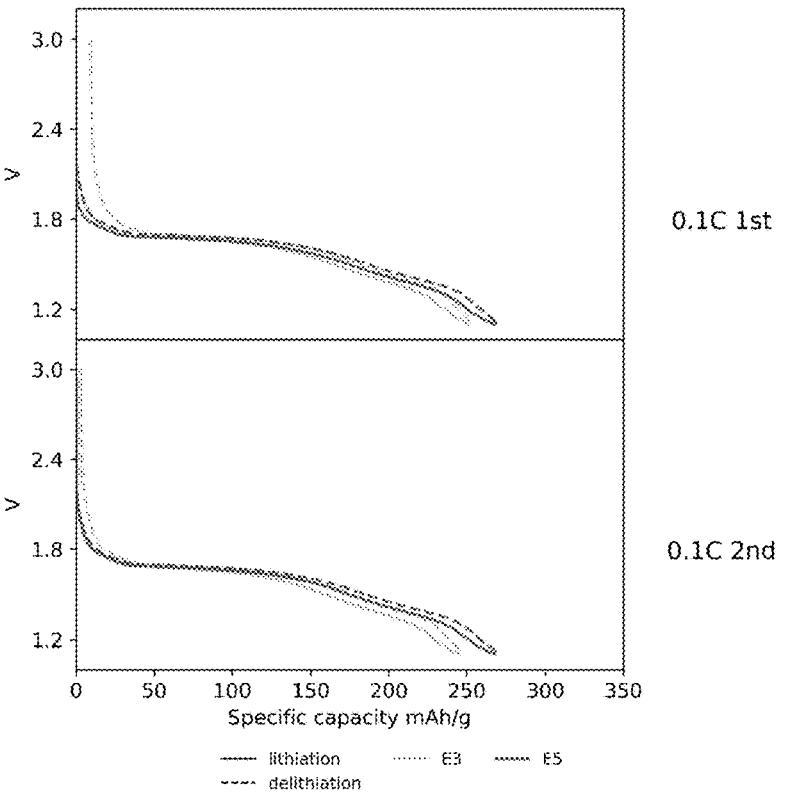
FIG. 26 shows representative lithiation and delithiation voltage profiles obtained by galvanostatic cycling in half cell configuration, 1.1-3.0 V voltage window, first 2 cycles at 0.1C rate for samples E3 and E5.
Figure 27:
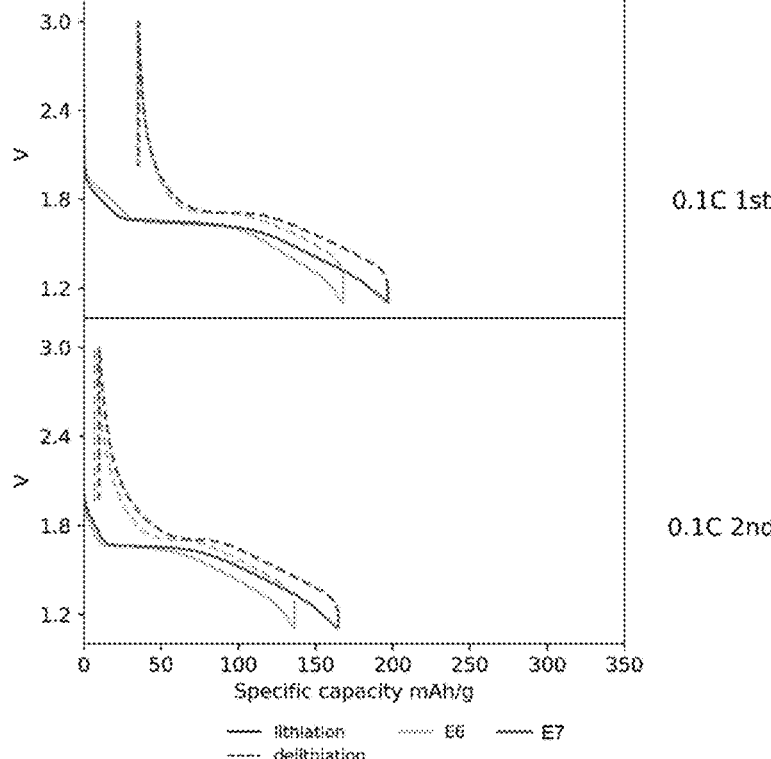
FIG. 27 shows representative lithiation and delithiation voltage profiles obtained by galvanostatic cycling in half cell configuration, 1.1-3.0 V voltage window, first 2 cycles at 0.1C rate for samples E6 and E7.
Figure 28:
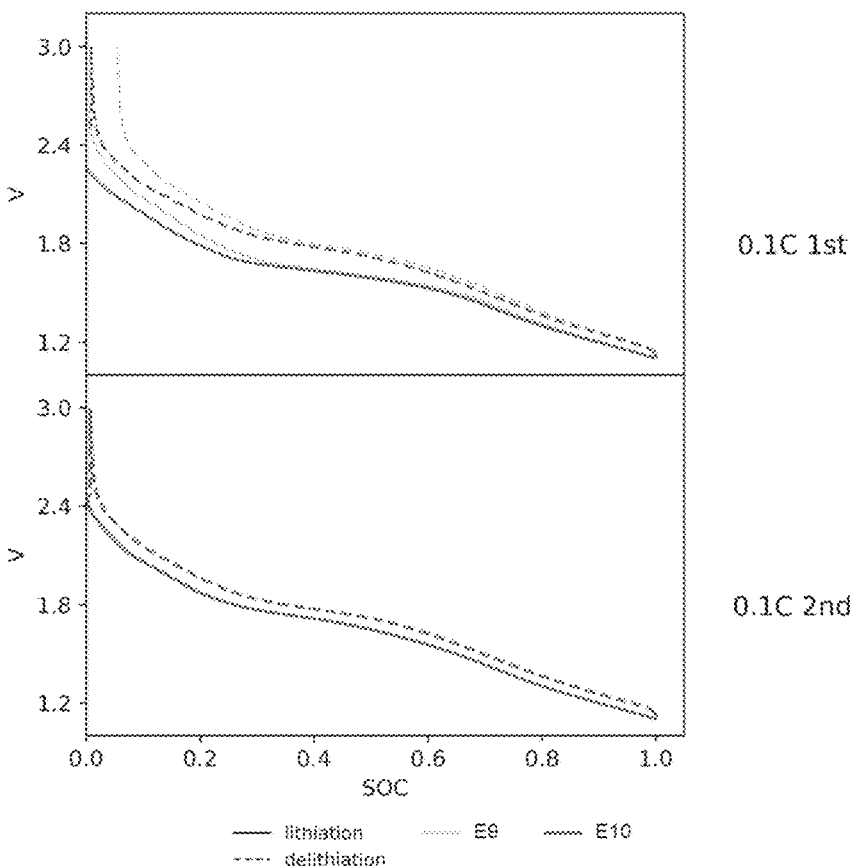
FIG. 28 shows representative lithiation and delithiation voltage profiles obtained by galvanostatic cycling in half cell configuration, 1.1-3.0 V voltage window, first 2 cycles at 0.1C rate for samples E9 and E10. The x axis is in terms of state-of-charge (SOC), to be able to normalise the curves to their maximum capacities and evaluate the curve shape.

FIG. 25 shows the advantage in modifying sample E1, particularly with regard to improving the observed specific capacity through substituting $Zn^{2+}$ cations with $Ge^{4+}$ cations of higher valency. FIG. 26 demonstrates the improved specific capacity observed on modifying sample E6 by substituting Ge4+ with K and Co cations, i.e. with cations of reduced valency. FIG. 28 demonstrates the improvement in ICE, and reduction in nominal lithiation voltage possible by introduction of induced oxygen vacancies that reduces polarisation effects through improving conductivity, and through improving the reversibility of lithiation/delithiation processes.

Across all materials tested, each material according to the invention demonstrates an improvement versus the unmodified 'base' crystal structure. This is inferred from measurements of resistivity/impedance by two different methods, and also electrochemical tests carried out in Li-ion half coin cells, particularly the capacity retention at increased current densities (cf. rates, Table 6, FIGS. 14 and 15). Without wishing to be bound by theory, the inventors suggest that this is a result of increased ionic and electronic conductivity of the materials as defects are introduced, or by alterations to the crystal lattice by varying ionic radii; also evidenced by DCIR/ASI (Table 5) and EIS (FIG. 16) measurements to show decreased resistance or impedance upon material modification. Li-ion diffusion rates likely also increase in materials according to the invention, as compared with the unmodified 'base' materials. Specific capacities themselves may also increase in some cases as shown in Table 6, as doping/exchange with metal ions of different sizes can expand or contract the crystal lattice and allow for more intercalation or more reversibility of intercalation of Li-ions than possible in the unmodified structure.

The data in Table 4 show a large reduction in the resistivity between sample 1 (comparative) and samples 2, 4, 5, 14, 15, 16, 18, 22, demonstrating the effect of embodiments of the present invention on improving electrical conductivity of the crystal structures through both cation exchange, oxygen deficiencies, and carbon coating. Samples 17, 19, and 20 also show a similarly low resistivity versus sample 6. The resistivity slightly increased upon incorporation of 0.05 equivalents of V species in the base crystal in sample 7, however an improvement in specific capacity was observed due to the changes in available Li-ion sites in the crystal lattice likely as a result of the differing ionic radius of V over Zr (see Table 6).

The data in Table 5 shows a large reduction in the DCIR/ASI from sample 1 (comparative) to samples 2, 4, 14, 16, 18 and 22, reflecting the trends shown in Table 4. Samples 7, 17, and 19 demonstrate a higher than these by DCIR, however these relate to a different base crystal structure. Without wishing to be bound by theory, the inventors hypothesise that samples 7, 17, and 19 demonstrate an increase in DCIR/ASI as compared with the comparative material of sample 6 ($ZrNb_{24}O_{62}$) due to the changes in the crystal lattice with the introduced cations of different ionic radii. However, it remains beneficial in terms of conductivity for these structures for samples 17 and 19 as the electrical resistivity is decreased as shown in Table 4, thereby minimising joule heating and enabling a more uniform current distribution across the material, which in turn can enable improved safety and lifetime of a Li ion system. For sample 7, whilst there is no demonstrated improvement utilising V to exchange with Zr, there is an increase in specific capacity, as discussed above.

In Table 6, across most samples there is a trend for improved specific capacities, initial Coulombic efficiencies (ICE), nominal lithiation voltage vs Li/Li+, and importantly capacity retention at 5C and 10C vs 0.5C for materials according to the invention versus the comparative 'base' materials (e.g. samples 1, 6, 8, 10, 12). For example samples 2, 3, 4, 5, 14, 15, 16, 18, 22 all demonstrate improvements in one or more of these parameters vs sample 1. This is also the case for samples 7, 17, 19 versus sample 6 across multiple parameters; sample 11 and 21 versus 10 where an improvement in specific capacity or capacity retention is observed; sample 9 versus 8 where ICE and capacity retention are improved; and sample 13 versus 12* where there are improvements in all parameters.

Figure 14:
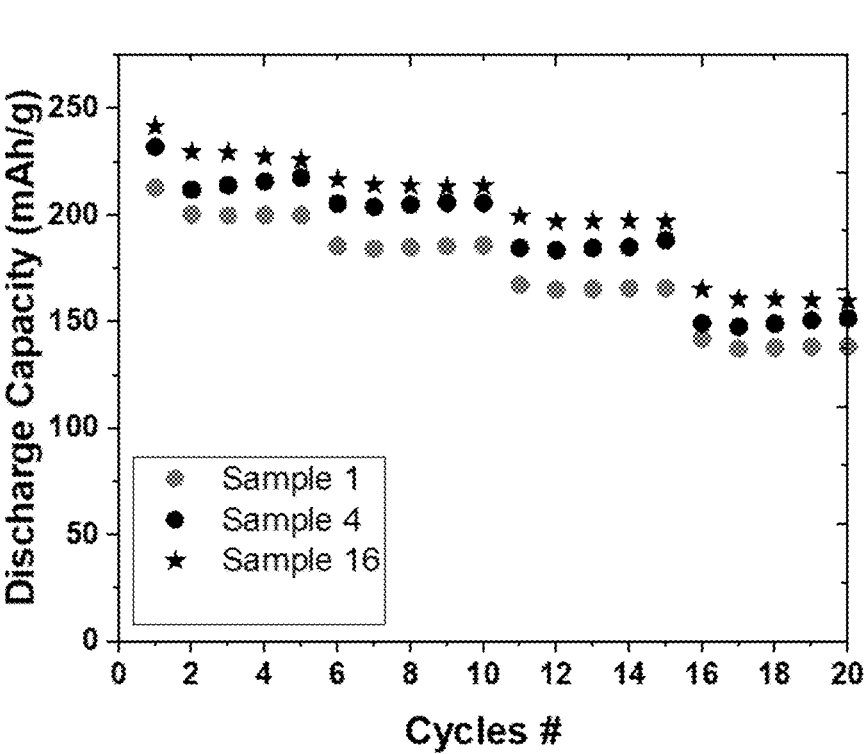
FIG. 14 shows lithiation and delithiation capacity obtained by galvanostatic cycling in half cell configuration, 1.1-3.0 V voltage window, at current densities of 0.5C, 10, 2C, 5C (seen as step-changes in the data) for samples 1, 4, and 16.
Figure 15:
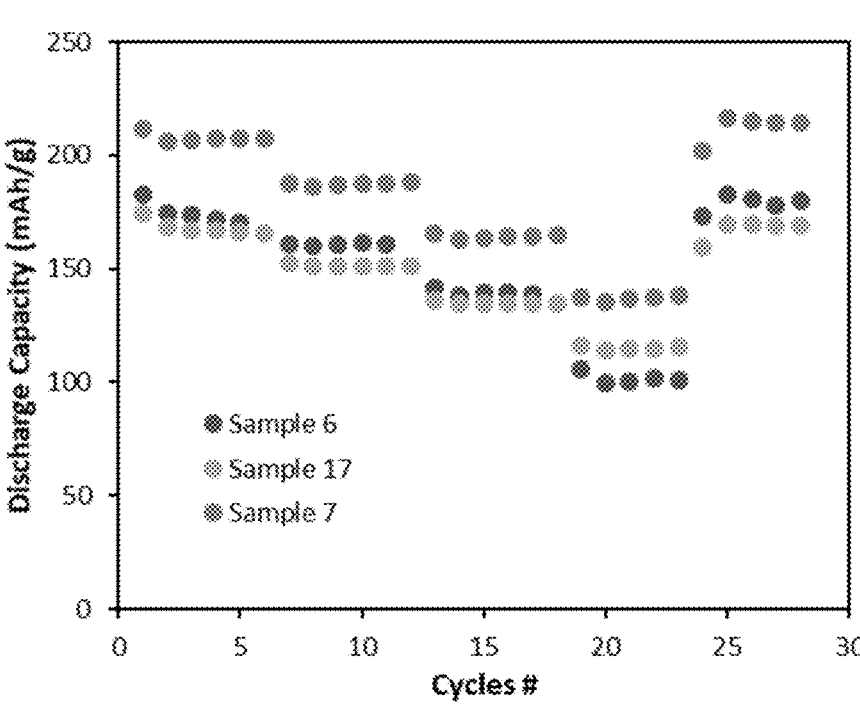
FIG. 15 shows Lithiation capacity obtained by galvanostatic cycling in half cell configuration, 1.1-3.0 V voltage window at current densities of 0.5C, 1C, 2C, 5C, 0.5C (seen as step changes in the data) for samples 6, 7, and 17.

FIGS. 14 and 15 demonstrate improved capacity retention at higher cycling rates for materials according to the invention (samples 4, 16, 7, 17) versus the comparative materials (samples 1 and 6).

Electrochemical impedance spectroscopy (EIS) measurements were also carried out to gain a further understanding on the impedance present in the electrode in a Li-ion cell. In a typical measurement, the cell is prepared as for DCIR measurements to ~50% lithiation and then the frequency of alternating charge/discharge current pulses is varied whilst measuring the impedance. By plotting the real and imaginary components as the axes, and varying the AC frequency, a Nyquist plot is generated. From this plot for a Li-ion cell different types of impedance in the cell can be identified, however it is typically complex to interpret. For example, Ohmic resistance can be partially separated from electrochemical double layer effects and also separated from diffusion effects.

Figure 16A:
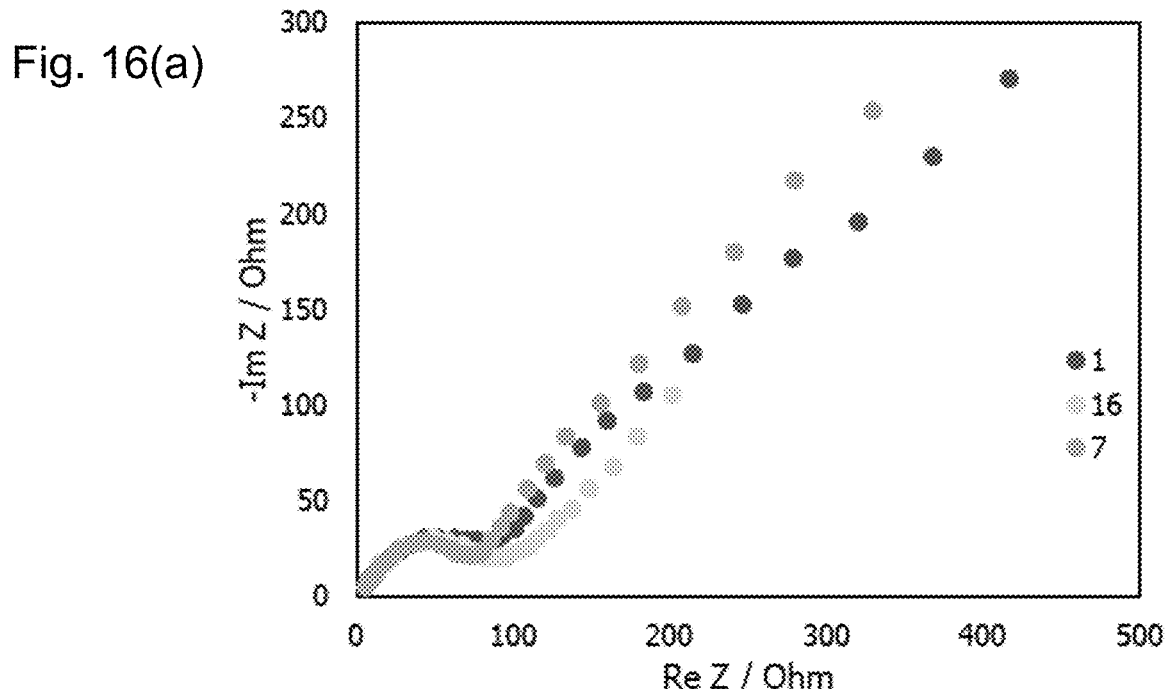
FIGS. 16(*a*) and (*b*) show EIS measurements of samples 1, 7, and 16 at different axes scales.
Figure 16B:
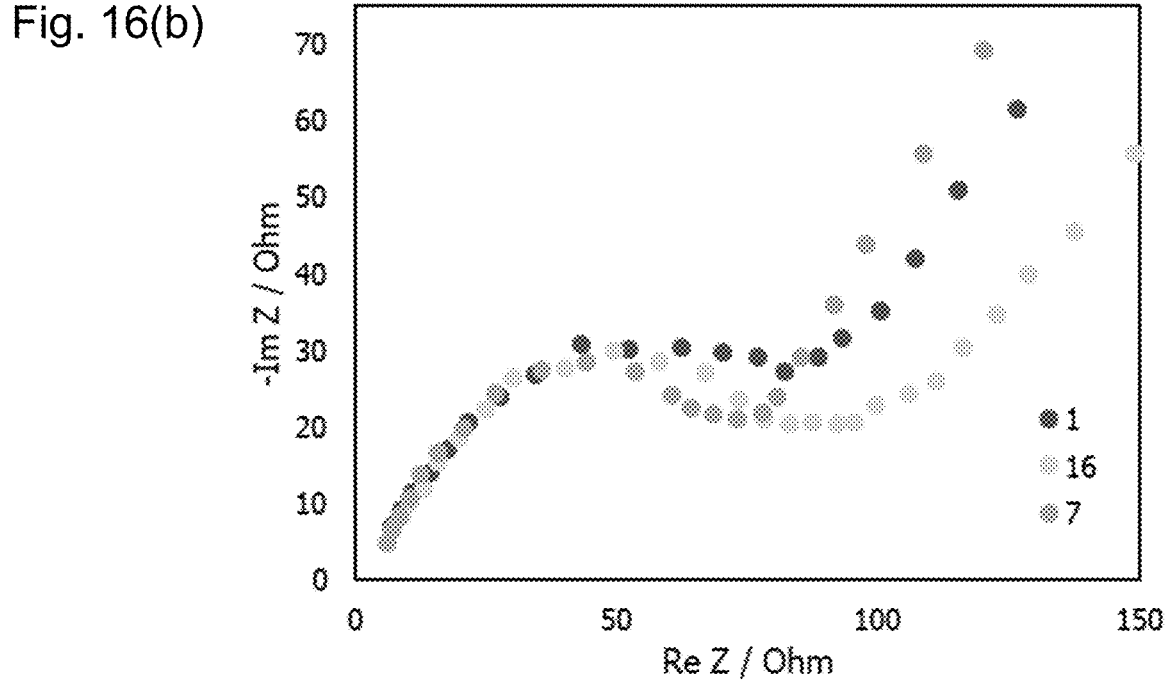

FIG. 16(a) and (b) show EIS spectra for (comparative) sample 1 and samples 16 and 7 (samples according to the invention).

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

Numbered Embodiments

The following numbered embodiments form part of the description.

1. An active electrode material expressed by the general formula $[M1]_x[M2]_{(1-x)}[Nb]_y[O]_z$, wherein:

M1 and M2 are different;

M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd;

M2 represents one or more of Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein x satisfies $0 < x < 0.5$;

y satisfies $0.5 \leq y \leq 49$ z satisfies $4 \leq z \leq 124$

2. The active electrode material according to embodiment 1, wherein M2 is selected from one or more of Mo, W, V, or Zr.

3. The active electrode material according to embodiment 2 wherein the $[M1]_x[M2]_{(1-x)}[Nb]_y[O]_z$ is a material selected from the group consisting of:

$M1_xMo_{(1-x)}Nb_{12}O_{(33-33\,\alpha)}$ $M1_xW_{(1-x)}Nb_{12}O_{(33-33\alpha)}$ $M1_xV_{(1-x)}Nb_9O_{(25-25\,\alpha)}$ $M1_xZr_{(1-x)}Nb_{24}O_{(62-62\,\alpha)}$ $M1_xW_{(1-x)}Nb_{0.57}O_{(4.43-4.43\,\alpha)}$ $M1_xW_{(1-x)}Nb_{0.89}O_{(5.22-5.22\,\alpha)}$ where M1 represents one or more of Ti, Mg, V, Cr, W, Zr, Nb, Mo, Cu, Fe, Ga, Ge, Ca, K, Ni, Co, Al, Sn, Mn, Ce, Te, Se, Si, Sb, Y, La, Hf, Ta, Re, Zn, In, or Cd; and wherein x satisfies $0 < x < 0.5$; and $\alpha$ satisfies $0 \leq \alpha \leq 0.05$.

4. The active electrode material according to any one of the preceding embodiments wherein the active electrode material is oxygen deficient.

5. An active electrode material expressed by the general formula $[M]_x[Nb]_y[O]_{(z'-z'\alpha)}$, selected from the group consisting of:

$MoNb_{12}O_{(33-33\,\alpha)}$ $WNb_{12}O_{(33-33\,\alpha)}$ $VNb_9O_{(25-25\,\alpha)}$ $ZrNb_{24}O_{(62-62\,\alpha)}$ $W_7Nb_4O_{(31-31\,\alpha)}$ $W_6Nb_8O_{(47-47\,\alpha)}$ wherein $\alpha$ satisfies $0 < \alpha \leq 0.05$.

6. The active electrode material according to any one of the preceding embodiments wherein at least some of the material has a Wadsley-Roth crystal structure and/or a tetragonal tungsten bronze crystal structure.

7. The active electrode material according to any one of the preceding embodiments wherein the active electrode material comprises a plurality of primary crystallites, some or all of the primary crystallites optionally being agglomerated into secondary particles.

8. The active electrode material according to embodiment 7, wherein the average diameter of the primary crystallites is from 10 nm to 10 μm.

9. The active electrode material according to embodiment 7 or embodiment 8, wherein some or all of the primary crystallites are agglomerated into secondary particles, and the average diameter of the secondary particles is from 1 μm to 30 μm.

10. The active electrode material according to any one of the preceding embodiments wherein the active electrode material comprises a carbon coating formed on the surface of the primary crystallites and/or secondary particles.

11. The active electrode material according to embodiment 10 wherein the carbon coating is present in an amount of up to 5 w/w%, based on the total weight of the active electrode material.

12. An active electrode material according to any one of the preceding embodiments wherein the crystal structure of the active electrode material, as determined by X-ray diffraction analysis, corresponds to the crystal structure of one or more of:

$MoNb_{12}O_{33}$ $WNb_{12}O_{33}$ $ZrNb_{24}O_{62}$ $VNb_9O_{25}$ $W_7Nb_4O_{31}$ $W_9Nb_8O_{47}$.

13. An active electrode material according to any one of the preceding embodiments, further comprising Li and/or Na.

14. An electrochemical device comprising an anode, a cathode and an electrolyte disposed between the anode and the cathode, wherein the anode comprises an electrode active material according to any one of embodiments 1 to 13.

15. A use of an electrode active material according to any one of embodiments 1 to 13 as an anode active material, or a component of an anode active material, in an anode in conjunction with a cathode and an electrolyte in: (i) a lithium ion battery for charging and discharging of the lithium ion battery; or (ii) a sodium ion battery for charging and discharging of the sodium ion battery.

16. A method for processing an electrode active material according to any one of embodiments 1 to 13 as or in an anode active material for: (i) a lithium ion battery, wherein the method includes diffusing lithium ions into the anode active material; or for (ii) a sodium ion battery, wherein the method includes diffusing sodium ions into the anode active material.

17. A method of making an active electrode material according to any one of embodiments 1 to 13, the method comprising steps of:

providing one or more precursor materials;

mixing said precursor materials to form a precursor material mixture; and heat treating the precursor material mixture in a temperature range from 400° C. — 1350° C. to form the active electrode material.

18. The method of making an active electrode material according to embodiment 17 wherein the one or more precursor materials includes a source of Mo, W, Zr, or V, and a source of Nb.

19. The method of making an active electrode material according to embodiment 17 or embodiment 18 wherein the one or more precursor materials includes an M1 ion source, an M2 ion source, and a source of Nb, and wherein the resulting active electrode material is a material as defined in any one of embodiments 1 to 4, or embodiments 6 to 13 as dependent from embodiment 1.

20. The method of making an active electrode material according to embodiment 17 wherein the precursor materials include one or more metal oxides, metal hydroxides, metal salts or oxalates.

21. The method according to any one of embodiments 17 to 20 wherein the one or more precursor materials are particulate materials, optionally having an average particle size of <20 μm in diameter.

22. The method according to any one of embodiments 17 to 21 wherein the step of mixing said precursor materials to form a precursor material mixture is performed by a process selected from dry or wet planetary ball milling, rolling ball milling, high shear milling, air jet milling, and/or impact milling.

23. The method according to any one of embodiments 17 to 22 wherein the step of heat treating the precursor material mixture is performed for a time of from 1 to 14 h.

24. The method according to any one of embodiments 17 to 23 wherein the step of heat treating the precursor material mixture is performed in a gaseous atmosphere, the gas being selected from air, $N_2$, Ar, He, $CO_2$, CO, $O_2$, $H_2$, and mixtures thereof.

25. The method according to any one of embodiments 17 to 24 wherein the method includes one or more post-processing steps selected from:
(i) heat treating the active electrode material;
(ii) mixing the active electrode material with a carbon source, and, optionally, further heating the mixture, thereby forming a carbon coating on the active electrode material;
(iii) spray-drying the active electrode material; and/or
(iv) milling the active electrode material to modify the active electrode material particle size.

REFERENCES

A number of publications are cited above in order to more fully describe and disclose the invention and the state of the art to which the invention pertains. Full citations for these references are provided below. The entirety of each of these references is incorporated herein.

Goodenough and Park, "The Li-Ion Rechargeable Battery: A Perspective", *Journal of the American Chemical Society* 2013 135 (4), 1167-1176, DOI: 10.1021/ja3091438

Griffith et al., High-Rate Intercalation without Nanostructuring in Metastable $Nb_2O_5$ Bronze Phases, Journal of the American Chemical Society 2016 138 (28), 8888-8899, DOI: 10.1021/jacs.6b04345

Griffith et al., "Structural Stability from Crystallographic Shear in $TiO_2Nb_2O_5$ Phases: Cation Ordering and Lithiation Behavior of $TiNb_{24}O_{62}$" *Inorganic Chemistry* (2017), 56, 7, 4002-4010

Montemayor et al., "Lithium insertion in two tetragonal tungsten bronze type phases, M8W9047 (M=Nb and Ta)", Journal of Material Chemistry (1998), 8, 2777-2781

Zhou et al., "Facile Spray Drying Route for the Three-Dimensional Graphene Encapsulated Fe2O3 Nanoparticles for Lithium Ion Battery Anodes", *Ind. Eng. Chem. Res.* (2013), 52, 1197-1204

Zhu et al., "$MoNb_{12}O_{33}$ as a new anode material for high-capacity, safe, rapid and durable Li+ storage: structural characteristics, electrochemical properties and working mechanisms", *J. Mater. Chem. A.* (2019), 7, 6522-6532

Yang et al., "Porous $ZrNb_{24}O_{62}$ Nanowires with Pseudocapacitive Behavior Achieve High-Performance Lithium-Ion Storage". *J. Mater. Chem. A.* (2017) 5. 10.1039/C7TA07347J.

The invention claimed is:

1. An active electrode material expressed by the general formula $[M][Nb]_y[O]_z$;
   wherein the active electrode material is oxygen deficient;
   wherein M consists of one of Mg, Cr, W, Mo, Cu, Ga, Ge, Ca, K, Ni, Co, Al, Sn, Mn, Ce, Sb, Y, La, Hf, Ta, Zn, In, or Cd;
   y satisfies $0.5 \leq y \leq 49$; and
   z satisfies $4 \leq z \leq 124$,
   wherein at least some of the active electrode material has a Wadsley-Roth crystal structure.

2. The active electrode material according to claim 1, wherein z is defined as $z=(z'-z'\alpha)$ wherein $\alpha$ satisfies $0<\alpha<0.05$.

3. The active electrode material according to any preceding claim 1, wherein M consists of one of Mo, W, Al, Zn, Ga, Ge, Ta, Cr, Cu, K, Mg, Ni, or Hf.

4. The active electrode material according to claim 1, expressed by the general formula $[M]_x[Nb]_y[O]_{(z'-z'\alpha)}$, selected from the group consisting of:
   $MoNb_{12}O_{(33-33\,\alpha)}$
   $WNb_{12}O_{(33-33\,\alpha)}$
   $Zn_{12}Nb_{34}O_{(87-87\,\alpha)}$
   $Cu_2Nb_{34}O_{(87-87\,\alpha)}$
   $AlNb_{11}O_{(29-29\,\alpha)}$
   $GaNb_{11}O_{(29-29\,\alpha)}$
   $GeNb_{18}O_{(47-47\,\alpha)}$
   $W_5Nb_{16}O_{(55-55\,\alpha)}$
   $AlNb_{49}O_{(124-124\,\alpha)}$
   $GaNb_{49}O_{(124-124\,\alpha)}$
   wherein $\alpha$ satisfies $0<\alpha<0.05$.

5. The active electrode material according to claim 1, expressed by the general formula $[M]_x[Nb]_y[O]_{(z'-z'\alpha)}$, selected from the group consisting of:
   $MoNb_{12}O_{(33-33\,\alpha)}$
   $WNb_{12}O_{(33-33\,\alpha)}$
   $Zn_2Nb_{34}O_{(87-87\,\alpha)}$
   $AlNb_{11}O_{(29-29\,\alpha)}$
   $GeNb_{18}O_{(47-47\,\alpha)}$
   wherein $\alpha$ satisfies $0 \leq \alpha \leq 0.05$.

6. The active electrode material according to claim 1, expressed by the general formula $[M]x[Nb]_y[O]_{(z'-z'\alpha)}$, selected from the group consisting of:
   $MoNb_{12}O_{(33-33\,\alpha)}$
   $WNb_{12}O_{(33-33\,\alpha)}$
   wherein $\alpha$ satisfies $0 \leq \alpha \leq 0.05$.

7. The active electrode material according to claim 1, wherein the active electrode material has the formula $MoNb_{12}O_{(33-33\,\alpha)}$ wherein $\alpha$ satisfies $0<\alpha<0.05$.

8. The active electrode material according to claim 1, wherein the active electrode material has the formula $WNb_{12}O_{(33-33\,\alpha)}$ wherein $\alpha$ satisfies $0<\alpha<0.05$.

9. The active electrode material according to claim 1, wherein the active electrode material has the formula $W_5Nb_6O_{(55-55\,\alpha)}$ wherein $\alpha$ satisfies $0<\alpha<0.05$.

10. The active electrode material according to claim 1, wherein the active electrode material has the formula $Zn_2Nb_{34}O_{(87-87\,\alpha)}$ wherein $\alpha$ satisfies $0<\alpha<0.05$.

11. The active electrode material according to claim 1, wherein the active electrode material has the formula $AlNb_{11}O_{(29-29\,\alpha)}$ wherein $\alpha$ satisfies $0<\alpha<0.05$.

12. The active electrode material according to claim 1, wherein the active electrode material is expressed by the general formula $[W][Nb]_y[O]_z$.

13. The active electrode material according to any preceding claim 1, wherein the crystal structure of the active electrode material as determined by X-ray diffraction corresponds to the crystal structure of the unmodified form of the active electrode material, wherein the unmodified form is expressed by the general formula $[M][Nb]_y[O]_z$ wherein the unmodified form is not oxygen deficient, wherein the unmodified form is selected from $M2^I Nb_5O_{13}$, $M2^I_6Nb_{10.8}O_{30}$, $M2^{II}Nb_2O_6$, $M2^{II}_2Nb_{34}O_{87}$, $M2^{III}Nb_{11}O_{29}$, $M2^{III}Nb_{49}O_{124}$, $M2^{IV}Nb_{24}O_{62}$, $M2^{IV}Nb_2O_7$, $M2^{IV}_2Nb_{10}O_{29}$, $M2^{IV}_2Nb_{14}O_{39}$, $M2^{IV}Nb_{14}O_{37}$, $M2^{IV}Nb_6O_{17}$, $M2^{IV}Nb_{18}O_{47}$, $M2^V Nb_9O_{25}$, $M2^V_4Nb_{18}O_{55}$, $M2^V_3Nb_{17}O_{50}$, $M2^{VI}Nb_{12}O_{33}$, $M2^{VI}_4Nb_{26}O_{77}$, $M2^{VI}_3Nb_{14}O_{44}$, $M2^{VI}_5Nb_{16}O_{55}$, $M2^{VI}_8Nb_{18}O_{69}$, $M2^{VI}Nb_2O_8$, $M2^{VI}_{20}Nb_{22}O_{115}$, $M2^{VI}_{82}Nb_{54}O_{381}$, $M2^{VI}_{31}Nb_{20}O_{143}$, $M2^{VI}_{15}Nb_2O_{50}$, $M2^{VI}_3Nb_2O_{14}$, and $M2^{VI}_{11}Nb_{12}O_{63}$, wherein the numerals I, II, III, IV, V, and VI represent the oxidation state of M.

14. The active electrode material according to claim 1, wherein substantially all of the active electrode material has a Wadsley-Roth crystal structure.

15. The active electrode material according to claim 1 wherein the active electrode material comprises a plurality of primary crystallites.

16. The active electrode material according to claim 15, wherein an average diameter of the primary crystallites is from 10 nm to 10 μm.

17. The active electrode material according to claim 15, wherein some or all of the primary crystallites are agglomerated into secondary particles, and an average diameter of the secondary particles is from 1 μm to 30 μm.

18. The active electrode material according to claim 17, wherein the active electrode material comprises a carbon coating formed on the surface of the primary crystallites and/or secondary particles.

19. The active electrode material according to claim 18 wherein the carbon coating is present in an amount of up to 5 w/w%, based on the total weight of the active electrode material.

20. The active electrode material according to claim 1, wherein the active electrode material has a BET surface area in the range of 0.1-100 m²/g, or 0.5-50 m²/g, or 1-20 m²/g.

21. An active electrode material according to claim 1 wherein the crystal structure of the active electrode material, as determined by X-ray diffraction analysis, corresponds to the crystal structure of one or more of:
$MoNb_{12}O_{33}$
$WNb_{12}O_{33}$
$Zn_2Nb_{34}O_{87}$
$CU_2Nb_{34}O_{87}$
$AlNb_{11}O_{29}$
$GaNb_{11}O_{29}$
$GeNb_{18}O_{47}$
$W_5Nb_{16}O_{55}$
$AlNb_{49}O_{124}$
$GaNb_{49}O_{124}$.

22. An active electrode material according to claim 1, further comprising Li and/or Na.

23. An electrochemical device comprising an anode, a cathode and an electrolyte disposed between the anode and the cathode, wherein the anode comprises the electrode active material according to claim 1.

24. The electrode active material according to claim 12, wherein the active electrode material is selected from $WNb_{12}O_{(33-33\alpha)}$, and $W_5Nb_{16}O_{(55-55\alpha)}$ wherein α satisfies $0<\alpha\leq0.05$.

\* \* \* \* \*